US008832660B2

(12) United States Patent
Lindo et al.

(10) Patent No.: US 8,832,660 B2
(45) Date of Patent: *Sep. 9, 2014

(54) ADVANCING AND REWINDING A REPLAYED PROGRAM EXECUTION

(75) Inventors: Jonathan Lindo, Los Altos, CA (US);
Jeffrey Daudel, South San Francisco, CA (US); Arpad Jakab, Oakland, CA (US); Suman Cherukuri, Cupertino, CA (US)

(73) Assignee: CA, Inc., Islandia, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 13/314,036

(22) Filed: Dec. 7, 2011

(65) Prior Publication Data

US 2013/0145108 A1 Jun. 6, 2013

Related U.S. Application Data

(63) Continuation of application No. 11/943,889, filed on Nov. 21, 2007, now Pat. No. 8,079,019.

(51) Int. Cl.
*G06F 9/44* (2006.01)

(52) U.S. Cl.
USPC ........... 717/124; 717/126; 717/128; 711/155; 711/156

(58) Field of Classification Search
None
See application file for complete search history.

(56) References Cited

U.S. PATENT DOCUMENTS

| 5,870,607 | A | 2/1999 | Netzer | |
|---|---|---|---|---|
| 6,282,701 | B1 * | 8/2001 | Wygodny et al. | 717/125 |
| 6,941,545 | B1 * | 9/2005 | Reese et al. | 717/130 |
| 6,954,923 | B1 * | 10/2005 | Yates et al. | 717/130 |
| 7,013,456 | B1 * | 3/2006 | Van Dyke et al. | 717/130 |
| 7,430,670 | B1 * | 9/2008 | Horning et al. | 713/190 |
| 7,823,135 | B2 * | 10/2010 | Horning et al. | 717/127 |
| 8,122,436 | B2 * | 2/2012 | Costa et al. | 717/128 |
| 2005/0177821 | A1 * | 8/2005 | Ogata et al. | 717/148 |
| 2005/0210275 | A1 * | 9/2005 | Homing et al. | 713/190 |
| 2006/0080531 | A1 * | 4/2006 | Sinha et al. | 713/168 |
| 2006/0101420 | A1 * | 5/2006 | Shinnar et al. | 717/130 |
| 2006/0242627 | A1 * | 10/2006 | Wygodny et al. | 717/128 |
| 2006/0247907 | A1 * | 11/2006 | Qadeer et al. | 703/22 |
| 2006/0265694 | A1 * | 11/2006 | Chilimbi et al. | 717/124 |
| 2010/0257511 | A1 * | 10/2010 | Hatabu | 717/131 |

OTHER PUBLICATIONS

European Search Report dated Jan. 23, 2013, European Application No. 08851356.9, filed Nov. 6, 2008, 8 pages.

(Continued)

*Primary Examiner* — Chameli Das
(74) *Attorney, Agent, or Firm* — Vierra Magen Marcus LLP

(57) ABSTRACT

In an embodiment, a data processing system comprises a storage system coupled to a unit under test comprising a heap memory, a static memory and a stack; second logic operable to perform: detecting one or more changes in a first state of the heap memory and the static memory; storing, in the storage system, as a state point of the unit under test, the one or more changes in the first state of the heap memory and the static memory; third logic operable to perform: receiving a request to change the memory under test to a particular state point; in response to the request, loading the particular state point from the storage system and applying the particular state point to the heap memory and the static memory to result in changing the heap memory and the static memory to a second state that is substantially equivalent to the first state.

13 Claims, 25 Drawing Sheets

(56) References Cited

OTHER PUBLICATIONS

Cornelis, et al., "A Taxonomy of Execution Replay Systems", International Conference on Advances in Infrastructure for Electronic Business, Education, Science, Medicine and Mobile Technologies on the Internet, Jan. 1, 2003, 8 pages.

Pan, et al., "Supporting reverse execution parallel programs", ACM SIGPLAN Notices, ACM, Association for Computing Machinery, New York, NY, US, vol. 24, No. 1, Jan. 1, 1989, pp. 124-129, 6 pages.

Feldman, et al., "IGOR: A system for program debugging via reversible execution", Proceedings of the ACM SIGPLAN and SIGOPS Workshop on Parallel and Disturbed Debugging, Jan. 1, 1988, pp. 112-123, 12 pages.

* cited by examiner

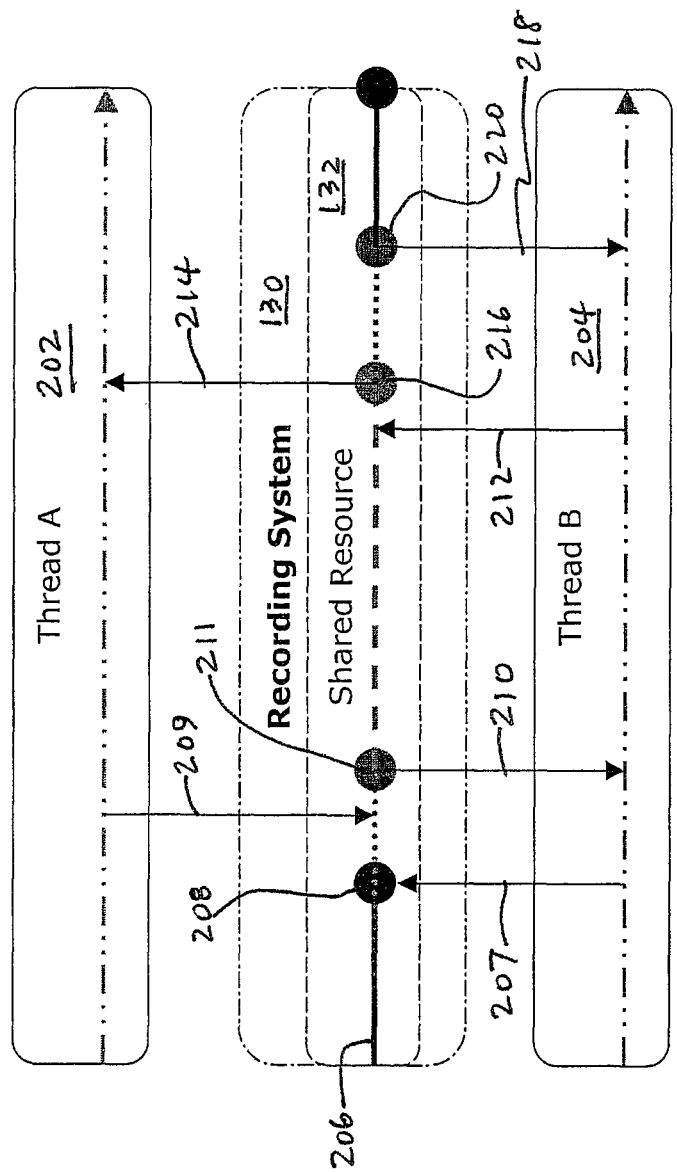

Exception Handler for State Synchronization

State Synchronization - Record Operations

ADVANCING AND REWINDING A REPLAYED PROGRAM EXECUTION

CROSS-REFERENCE TO RELATED APPLICATIONS; BENEFIT CLAIM

This application claims the benefit under 35 U.S.C. §120 as a Continuation of application Ser. No. 11/943,889, filed Nov. 21, 2007, now U.S. Pat. No. 8,079,019 the entire content of which is hereby incorporated by reference as if fully set forth herein. This application is related to application Ser. No. 11/449,156, now U.S. Pat. No. 7,958,497 filed Jun. 7, 2006, the entire content of which is incorporated by reference as if fully set forth herein. The Applicants hereby rescind any disclaimer of claim scope in the parent application(s) or the prosecution history thereof and advise the USPTO that the claims in this application may be broader than any claim in the parent application(s).

FIELD OF THE INVENTION

The present disclosure relates to debugging computer programs. The disclosure relates more specifically to storing and using state data relating to an execution path of a computer program.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Computer software development often involves several progressive phases such as definition, coding, quality assurance (QA) and testing, error removal or "debugging," and maintenance. In commercial software development, testing and debugging often consumes considerable time, and may account for the largest time component in a development project. Traditional bug fixing requires detailed communication between testers and developers. Time is often wasted going back and forth between testers and developers trying to reproduce and isolate problems. Verifying that a bug has been fixed is error-prone and time consuming. Therefore, software developers are continually looking for ways to reduce the amount of time spent on testing and debugging.

One approach is to outsource QA and testing to test personnel in another location, even another country. However, outsourcing can involve language barriers and communication barriers when a developer prepares and sends written bug reports in a local language to QA personnel in another country who speak another language. Distance barriers, and complications arising from having developers and testers in different physical locations or even different time zones also can exist. Developers would like to have a software testing solution that facilitates communication in an outsourced environment.

Scheduling QA testing within the software development cycle can be difficult. Finding and fixing bugs is unpredictable, at best. Delays in QA testing can lead to late releases, missed market windows, and lost revenue. These issues may be acute in the fast-paced environment involved in developing computer games for platforms such as the PC, Microsoft XBOX family, Sony Playstation family, Nintendo, etc.

To address these issues, several types of program execution recording systems have been developed. Generally, program-recording systems record information about a program under test as the program executes, and provide reports about that information. However, consistently reproducing bugs is a serious problem in software development, and achieving it typically involves expending significant resources. Some systems facilitate replaying program execution on a repeated basis. Using these systems, debugging is improved because bugs are reproducible by replaying a particular program execution session.

Types of program recording systems include external I/O recorders, source code instrumenters, and binary patching systems. Generally, external I/O recorders create and store recordings of network I/O operations, user input, and graphics or display 3-D (D3D) information. External I/O recorders may be use to simulate such external input to a program. External I/O recorders do not require any modifications to program code, are robust in response to code and asset changes, and can be used for cross-platform testing and demos. However, external I/O recorders may not produce accurate program replays due to timing issues, such as irregular network delays, or race conditions. Further, external I/O recorders may be unusable with some platforms for security reasons. External I/O recorders do not account for non-determinism in programs associated with thread context switching. External I/O recorders are sometimes termed macro recorders. A commercial example is Mercury Interactive's WinRunner.

Source code instrumenters usually provide proxy API libraries and modules; a developer must include the libraries or modules in source code for testing purposes. Source code instrumenters are somewhat reusable, can be easily expanded and tuned, and recordings may be portable across platforms. However, source code instrumenters are applicable only to modules for which program source code is available; they cannot be used to debug programs for which only executable machine code is available. Source code instrumenters typically require the use of a specialized API for certain calls by the developer, or a code-parsing module. Thus, the developer shoulders the burden of inserting the correct API calls in the source code of the program under test. Further, source code instrumenters provide no support for third-party modules such as dynamic linked libraries (DLLs) or linked executables, because such modules will not contain the required API calls at the time of testing. Source code instrumenters may not provide 100% accurate replays due to the effect of external events that are not trapped and recorded.

Binary patching systems operate by adding specialized recording code to the binary machine code of a program under test after compilation. A commercial example is Rational Purify. Binary patching systems are highly reusable and can produce accurate recordings by capturing detailed operational data. Binary patching systems do not require source code modifications, and can be applied to any executable, library or DLL. When disabled, binary patching systems do not affect program execution or size. Binary patching systems can capture low-level program calls, e.g., calls to hardware elements.

However, binary patching systems can be fragile when code or assets change. A recording of a program of a first version may be incompatible for replay when the program is modified to a later version. Binary patching systems may require special support for certain APIs, such as those relating to networking. Binary patching systems typically require special support for different processors having different machine instruction sets, and for different binary file formats (e.g., PE, XBE, ELF). Binary patching systems do not readily produce recordings that are portable across platforms. Further, crossmodule inlining of code (e.g., using Link Time Code Generation (LTCG)) can distort function boundaries and make patching inaccurate.

In addition, known binary patching systems are not capable of recording all sources of non-determinism that may exist in an application.

Prior approaches have not provided efficient or convenient approaches for skipping ahead or backward to different points in execution of a program. One prior approach involves stack walking. Another prior approach, which is used for example in implementing "hibernate" functions of conventional personal computers, involves storing a copy of all values stored in memory—that is, the entire contents of memory—and elated state data on disk, and restoring the stored values when hibernation ends. While this approach captures the entire state of a system at a particular point in time, this approach is extremely inefficient because of the amount of data that needs to be stored and typically requires at least several seconds to accomplish a restore operation. Therefore, this approach is not practical for use when the state of the system needs to be stored frequently and restored rapidly. Further, the hibernation approach does not permit reverting or rewinding to a previous state of the system.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2C is a block diagram illustrating how thread context switches are recorded.

DETAILED DESCRIPTION

Figure 1A:
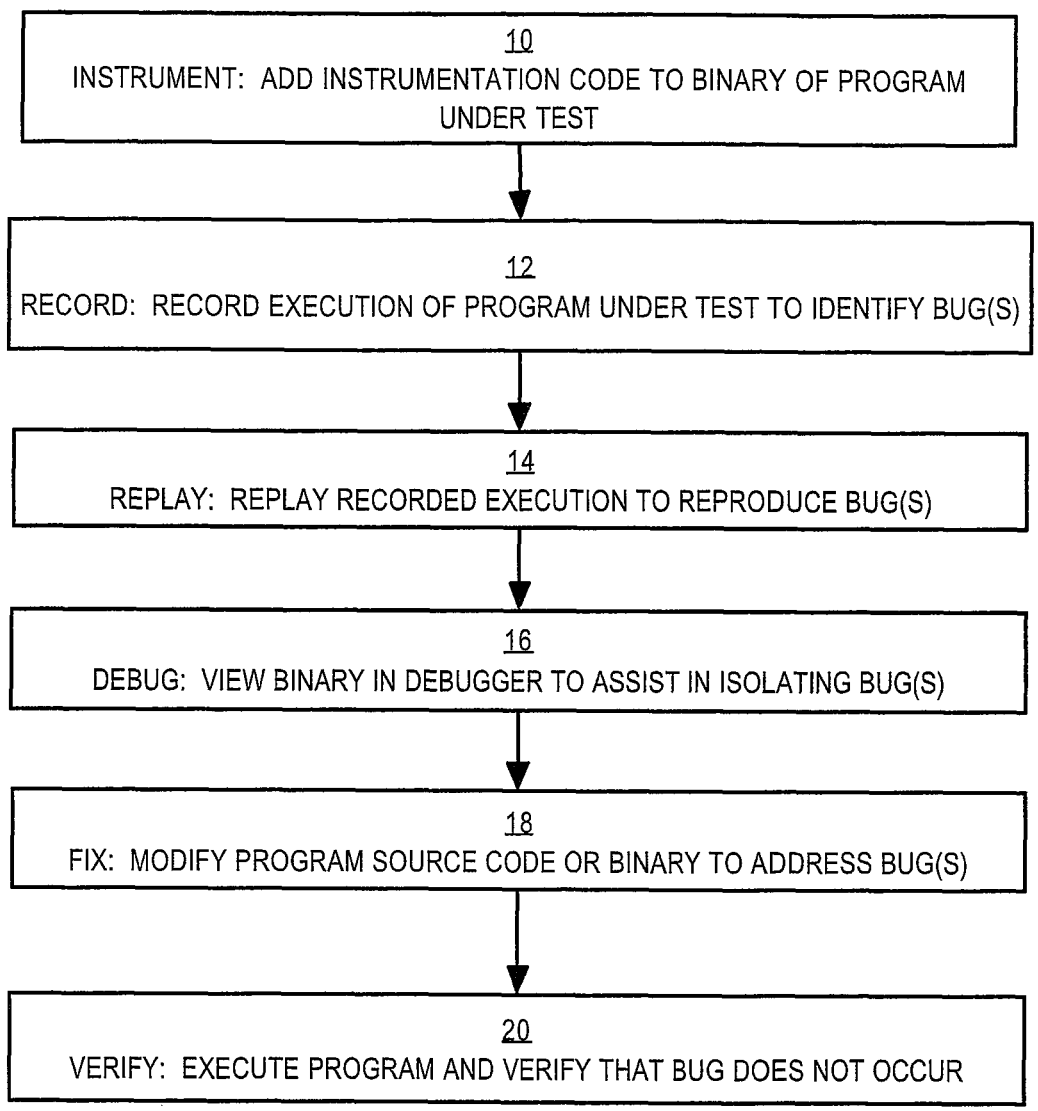
FIG. 1A is a flow diagram of a method of testing a computer program.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Methods for Recording and Replaying a Computer Program
   3.1 Recording a Replay Stream Representing Program Execution
      3.1.1 Recording Asynchronous Callbacks
      3.1.2 Recording Exceptions
      3.1.3 Recording Thread Context Switches
      3.1.4 Shared Memory Access
      3.1.5 Memory Management
      3.1.6 Efficient Storage of Recorded Replay Data
   3.2 Replaying a Replay Stream
      3.2.1 Replaying on Different Machines
      3.2.2 Fast Forwarding and Skipping State
      3.2.3 Replaying Data Values Read from Non-Initialized Memory
   3.3 Example Replay Stream Data Format
   3.4 Approaches for Applying Instrumentation Code to Program Binaries
4.0 Software Development Management Using Replay System
   4.1 User Interface Example
   4.2 Example Bug Communication Process
   4.3 Other Uses and Benefits 5.0 Management Techniques
   5.1 State Synchronization Techniques
   5.2 Advancing and Rewinding Using State Points
6.0 Implementation Mechanisms—Hardware Overview
7.0 Extensions and Alternatives
1.0 General Overview In an embodiment, a data processing system comprises a storage system; first logic, coupled to the storage system and to a unit under test comprising a heap memory, a static memory and a stack, and the first logic when executed is operable to interface to the heap memory and static memory; second logic which when executed is operable to perform: detecting one or more changes in a first state of the heap memory and the static memory; storing, in the storage system, as a state point of the unit under test, the one or more changes in the first state of the heap memory and the static memory; third logic which when executed is operable to perform: receiving a request to change the memory under test to a particular state point; in response to the request, loading the particular state point from the storage system and applying the particular state point to the heap memory and the static memory to result in changing the heap memory and the static memory to a second state that is substantially equivalent to the first state.

In one feature, the second logic is operable to perform receiving a copy of the stack and to store the copy of the stack memory as part of the state point. In another feature, the second logic is operable to perform storing data about one or more threads and contexts associated with the first state as part of the state point, and storing data about one or more system resources associated with the first state as part of the state point.

In another feature, the third logic is further operable to perform: restoring one or more threads and contexts that are associated with the first state; restoring one or more system resources that are associated with the first state.

In a further feature, the second logic is operable to perform: causing the unit under test to write-protect all pages of the heap memory and the static memory; installing in the unit under test a first exception handler responsive to a first write exception of the heap memory and a second exception handler responsive to a second exception of the static memory, and the exception handlers are configured to respond to a particular write exception of a particular page by storing a copy of the particular page, making the particular page writable, and restoring execution of the unit under test; comparing the copy of the particular page to the particular page; creating and storing the one or more changes based on the comparing.

In yet another feature, the second logic is operable to perform the comparing and the creating and storing in response to any of a timer and a programmatic call.

In still another feature, the third logic is operable to perform: receiving a request to change the memory under test to a particular state point, and the particular state point is later than a current point of execution of the unit under test; setting the unit under test to a second state point that is earlier than the particular state point, by retrieving stored pages of the heap memory and the static memory associated with the second state point and copying the retrieved stored pages of the heap memory and the static memory associated with the second state point to the heap memory and the static memory of the unit under test; applying all changes associated with the particular state point to the heap memory and the static memory of the unit under test.

In another feature, the third logic when executed is operable to perform: at a particular point in execution of the unit under test, receiving data about a write exception to a particular page; determining whether the storage system includes data about the write exception; determining that a replay synchronization error has occurred when the storage system does not include data about the write exception, and response thereto: setting the unit under test to a second state point that is earlier than the particular point in execution, by retrieving stored pages of the heap memory and the static memory associated with the second state point and copying the retrieved stored pages of the heap memory and the static memory associated with the second state point to the heap memory and the static memory of the unit under test; applying, to the heap memory and the static memory of the unit under test, all changes associated with the next state point stored in the storage system after the second state point; repeating the applying step until reaching another state point that is closest in time to the particular point in execution.

In another feature, the second logic is operable to perform the detecting and storing for a marker state point automatically just before the unit under test executes any of a plurality of specified operations of an operating system of the unit under test. In another feature, the specified operations comprise windowing operations and thread operations.

In a further feature, the third logic is operable to perform fast-forward replay of execution of the unit under test by performing: changing the unit under test to a state represented by a particular marker point; causing the unit under test to execute one of the specified operations; changing the unit under test to a state represented by a next state point in the storage system.

In other embodiments, the invention encompasses a computer-readable storage medium encoded with instructions which when executed may cause one or more processors to perform the functions of the system described in this section, and a system comprising means for performing the functions of the system described in this section, and a method, which may be computer-implemented, comprising steps corresponding to the functions of the system described in this section.

2.0 Structural and Functional Overview

FIG. 1A is a flow diagram of a method of testing a computer program. Generally, the method of FIG. 1A involves steps to instrument, record, replay, debug, fix, and verify. In step 10, Instrument, one or more elements of instrumentation code are added to a binary file representing a program under test. The binary file is an executable version of an application program that needs to be tested, debugged, verified, or otherwise examined. The instrumentation code intercepts or traps certain application operations and records data relating to the operations. Specific approaches for performing binary instrumentation are described further below.

In this description, the terms application, program under test and binary file refer interchangeably to a user software program that executes instructions. The term operating system or system refers to the low-level software program that a software application interacts with, and which isolates an application from directly interfacing computer hardware in most cases. The term replay system refers to a software program that interacts with both the application and the system and acts an intermediary between the two. It has two modes: record and replay. During record it captures data from non-deterministic function outputs. During replay, it writes the previous data back into nondeterministic function outputs.

In step 12, Record, execution of the program under test is recorded to identify one or more bugs. For example, the program under test is started, and a user interacts with the program according to the normal manner of using the program. Depending on the goals of the user, the user provides input or otherwise manipulates the program until a bug is found by observation of program performance. For example, the program may crash, provide unexpected output, etc.

Recording execution of a program involves programmatically capturing and storing information identifying all sources of non-determinism that may affect the program. Replay stream information is stored in persistent storage and identifies non-deterministic events. Specific approaches for performing recording of non-deterministic events are described further below. Test personnel can attach the stored replay stream information for a portion of a program that contains a bug results to a bug report and send the bug report to a developer.

Many mechanisms may provide non-deterministic input to a program. For example, some known sources of non-determinism include user input, programmatic timers, asynchronous callbacks, thread context switching, direct memory access (DMA) timing, shared memory access, and interrupts. In an embodiment, information identifying all the foregoing non-deterministic sources is recorded and stored as a program executes, and replayed in at Replay step 14.

A source of non-determinism in the form of user input may include input from a keyboard, mouse, joystick, or other device, which varies in timing and in value across different sessions of use of a program.

Non-deterministic input from programmatic timers includes any query to a system clock that a program performs. In the context of game software development, for example, timer queries are commonly used to support simulations of physical movement, changes in on-screen character position in networked games based on timer interpolation or dead reckoning, etc. Further, game code may operate on different execution paths depending on the amount of time that has passed between actions.

Asynchronous callbacks are considered non-deterministic because it is not possible to predict when callbacks will arrive for tasks that a program has "handed off" to an operating system routine or to another program. For example, the operating system may require a different amount of time to perform such tasks depending on network conditions, resource conditions, etc.

Thread context switching is non-deterministic because the time at which a CPU switches from executing one thread to another is not readily predictable, so that the order of operations performed by multiple threads may vary, and therefore the path of execution in code may vary among execution sessions. DMA timing is non-deterministic because the state of system main memory can change between successive program accesses to the memory if system hardware performs intervening DMA accesses. Shared memory access is a source of non-determinism because multiple threads may set values in shared memory at different times without informing the application under test. Interrupt routines are potential sources of non-determinism, and therefore interrupt routines are trapped and replayed.

In step 14, Replay, execution of the program is replayed, by running the program and substituting information from the stored replay stream for all non-deterministic events that are associated with a recorded execution. Specific approaches for performing replay are described further below. The Replay step can be performed by a developer who has received a bug report that contains an attached replay stream recording. Thus, the approaches herein enable the developer to immediately reproduce the bug by replaying the recorded replay stream.

Typically, Replay at step 14 concludes at a point in program execution at which a bug occurs. In step 16, Debug, a debugger program is started and loaded with the program binary. A user can set breakpoints in the debugger at points in the binary that may be close to code containing a bug, modify machine instructions in an attempt to remove the bug, etc., or otherwise use the debugger to solve problems associated with one or more bugs. Step 18, Fix, represents applying such fixes using a debugger, or modifying program source code and recompiling the source code into a new binary executable file. Typically steps 16, 18 are also performed by a developer who has received a bug report with a stored replay stream.

In step 20, Verify, the program is executed again, using the replay stream, to verify that the bug does not occur or has been eliminated. Typically, step 20 is performed by test personnel after receiving communication from developers that a bug has been removed.

The approach of FIG. 1A facilitates an efficient, fast method of detecting and eliminating bugs in computer programs. Redundant cycles in the bug fix workflow are eliminated. There is no need for back-and-forth communication between the tester and the developer to collect additional bug information. The recorded replay stream provides all information that the developer needs to reproduce a bug found by a tester. Verifying removal of a bug is as simple as replaying the recording of the bug to verify that program operation meets expectations.

Figure 1B:
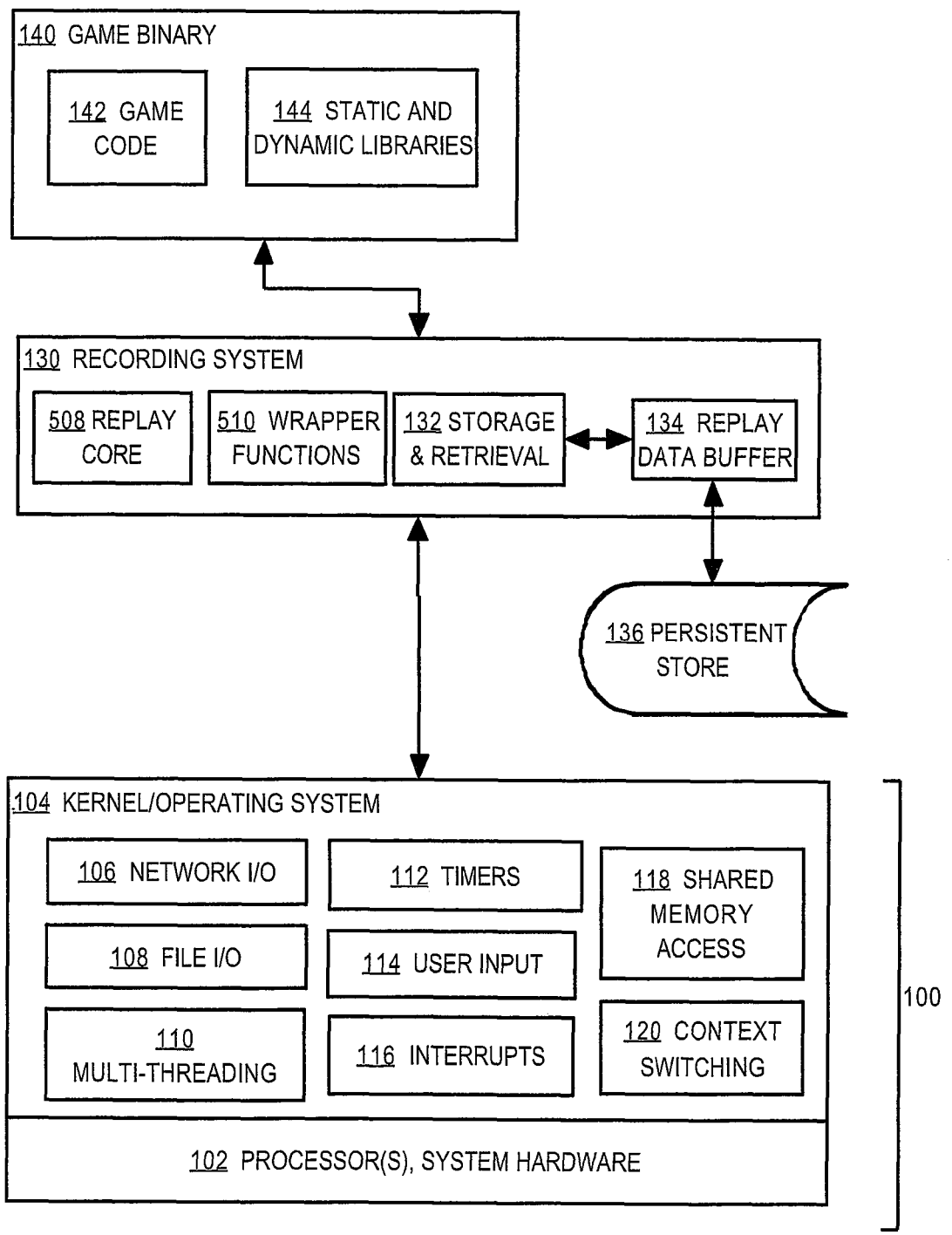
FIG. 1B is a block diagram of a computer system that includes a recording system.

FIG. 1B is a block diagram of a computer system that includes a recording system according to an embodiment. A computer system 100 includes one or more processors and other system hardware such as video graphics electronics, memory, and storage, collectively designated as hardware 102, which hosts an operating system 104. The operating system 104 provides interfaces to hardware 102 for application programs, and supervises and controls the application programs. Thus, in most cases operating system 104 isolates the application from the hardware. In one embodiment, operating system 104 is based upon a kernel element, but a kernel-based OS is not required.

Operating system 104 also includes one or more sources of non-determinism that affect execution of an application program that the operating system supervises. In one embodiment, sources of non-determinism may include a network I/O module 106, file I/O module 108, multi-threading module 110, timers 112, user input 114, interrupts 116, shared memory access 118, and context switching events 120.

A replay system 130 runs on operating system 104. The replay system 130 is configured to programmatically capture and store information identifying all sources of non-determinism that may affect the program, create and store replay stream information in persistent storage and that identifies non-deterministic events, and to replay a program under test while supplying the replay information.

In the example of FIG. 1B, game binary 140 is a program under test, and represents a binary executable version of a game computer program. Game binary 140 comprises game code 142, representing machine code for a game, and one or more static libraries or DLLs 144. Replay system 130 is shown logically between game binary 140 and operating system 104 because, during the Instrument step 10 of FIG. 1A, the recording system modifies the game binary in a way that logically inserts the recording system between the game binary and the operating system. Further, the Record step of FIG. 1A, during execution of game binary 140, replay system 130 intercepts all requests of the game code 142 to use services of operating system 104, such as services of modules 106-120, and the recording system services all such requests instead. In the Replay step 14 of FIG. 1A, replay system 130 provides all information that the services of modules 106-120 actually provided during the first execution and recording.

Replay system 130 also includes replay core 508 and wrapper functions 510, which are described further below with respect to FIG. 5.

3.0 Methods for Recording and Replaying a Computer Program

In this section 3.0, the term "program binary" refers to a binary file containing machine code and libraries for a computer program undergoing test, debugging, or other evaluation.

3.1 Recording a Replay Stream Representing Program Execution

3.1.1 Recording Asynchronous Callbacks

According to one embodiment, asynchronous callbacks are recorded and replayed. Callbacks are function calls that the system may make into the application space. In conventional practice, program developers are required to provide a callback handler routine in a program binary for each asynchronous callback that an operating system might send to the program binary. In such cases, the application registers a callback handler with the operating system and specifies an entry the system may use. Example usages of callbacks are system events or notifications, which can be nondeterministic. For example, Microsoft Windows messages and user input events might generate callbacks to the application such as mouse or keyboard events.

Generally, an approach for recording and replaying asynchronous callbacks involves tracking when a callback or exception is made while executing a system call. To perform such tracking, the replay system first intercepts the function calls that register callback handlers. The replay system installs a proxy callback routine so that the system will notify the replay system when a callback occurs and not the application directly. This approach isolates the application from any nondeterministic interaction that can be generated from the system.

Figure 1C:
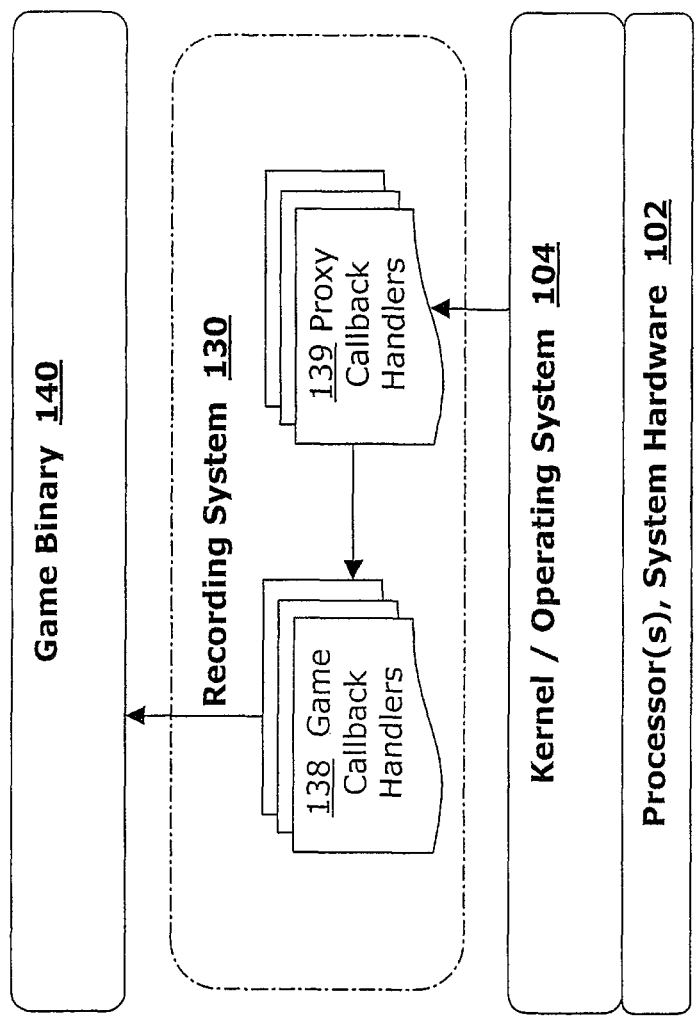
FIG. 1C is a block diagram that illustrates a general approach for recording and replaying asynchronous callbacks in the context of the system of FIG. 1B.

FIG. 1C is a block diagram that illustrates a general approach for recording and replaying asynchronous callbacks in the context of the system of FIG. 1B. In an embodiment, tracking asynchronous callbacks includes detecting that game binary 140 is attempting to register one or more game callback handlers 138 with operating system 104, and registering one or more proxy callback handlers 139 with the operating system as substitutes for the game callback handlers. Such installation may use an instrumentation approach that is described further below, resulting in creating a modified game binary that includes the proxy callback handlers within a proxy space of the game binary.

The proxy callback handlers 139 perform asynchronous callback handling on behalf of the game callback handlers 138. For example, system 104 may call the proxy callback handlers 139 with callback or exception events. The replay system 130 intercepts such calls, records callback information as needed, and then calls the game callback handlers 138 with the same callback and exception events.

The recorded information includes a sync point so that a callback can be replayed at the same point in execution that the callback occurred at the time of recording. Sync points represent an order at which a callback occurred, but not necessarily the absolute time at which a callback occurred. In an embodiment, integer values termed sync index values represent sync points. Index values are described further herein with respect to FIG. 7.

Upon re-execution of the program and playback of a replay stream, asynchronous callback events are queued in the proxy callback handlers 139 for delivery to the game binary 140. The callback events are delivered from the queues at the appropriate recorded sync point. This approach may result in the replay system 130 blocking delivery of events until an appropriate point during execution; however, the use of callback delivery queues guarantees that program replay accurately reproduces an earlier recorded execution session. The callback events are delivered from the proxy callback handlers 139 to the game callback handlers 138 in the game binary 140. Thus, during replay, simulated callback events are delivered to the game binary 140 at specific recorded points. This approach can be applied to message callbacks, sound system callbacks, or any other asynchronous input/output.

As an application makes a system function call, the replay system monitors whether the system makes a callback or multiple callbacks during the function call. The replay system records all nondeterministic data that is passed in during each callback to the application. After the data is recorded, the replay system allows the original callback to be received by the application through the original registered callback handler. This approach allows the application to receive the callbacks, as it would do normally without replay.

Figure 2A:
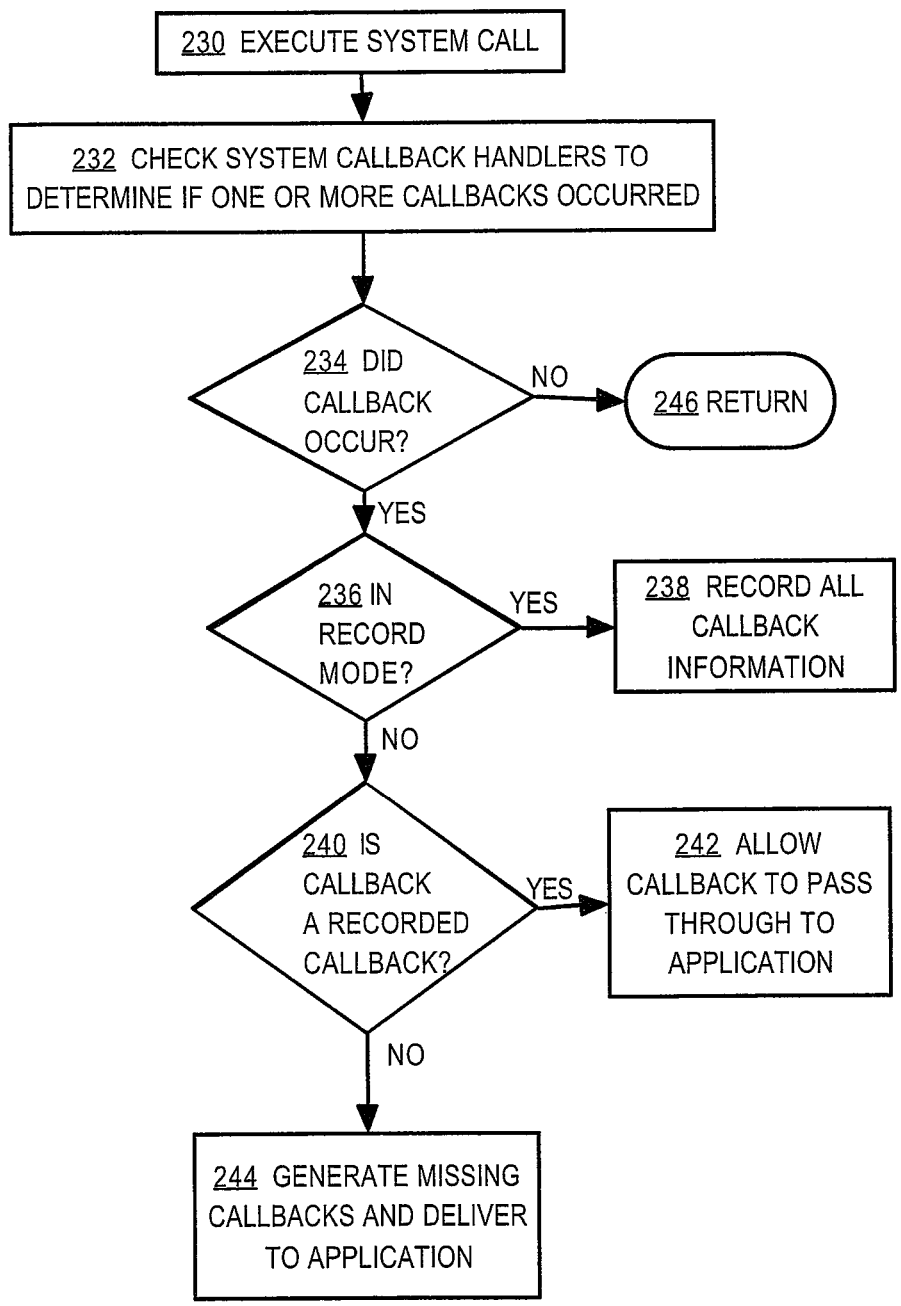
FIG. 2A is a flow diagram illustrating a process of recording and replaying asynchronous callbacks in one embodiment of the foregoing approaches.

FIG. 2A is a flow diagram illustrating a process of recording and replaying asynchronous callbacks in one embodiment of the foregoing approaches.

In step 230, an operating system executes a system call. At step 232, the replay system checks system callback handlers to determine if one or more callbacks occurred. If a callback did not occur, as tested at step 234, then control returns to the replay system for other processing at step 246.

If a callback occurred and the replay system is in record mode, as tested at step 236, then in step 238 all callback information is recorded in a replay stream. If the replay system is not in record mode, then the replay system is in replay mode and in step 240 the process tests whether the callback is a recorded callback. If so, then in step 242 the replay system allows the callback to pass through to the application. If not, then at step 244 the replay system generates the missing callback and delivers associated output to the application.

As indicated in FIG. 2A, during replay, proxy callbacks are substituted. However, the replay system blocks all callbacks from the system that do not occur at the same time that they occurred during recording. Only callbacks that exactly match the recording are allowed to pass through to the application. For callbacks that do not occur at the same time, the replay system simulates a callback using the recorded non-deterministic. This approach allows the application to receive the exact same callbacks as when recorded.

Notably, replay system 130 can determine whether an asynchronous callback from the system has occurred only when the application calls a non-deterministic system API call such that the replay system acquires control of execution and can make the appropriate decision. When the application is executing instructions other than non-deterministic system calls, the replay system 130 does not affect application execution.

3.1.2 Recording Exceptions

Exceptions are another form of flow control that an operating system may send to an application when a function call is made. Exceptions can be nondeterministic. According to an embodiment, replay system 130 processes exceptions in a similar manner as callbacks. In one embodiment, replay system 130 installs an exception handler for each application function that the replay system intercepts and that makes a function call into the operating system. The exception handler monitors whether an exception is thrown. In record mode, any exception is recorded, and multiple exceptions may be recorded. Once the nondeterministic data is recorded, which often includes all the exception information, the exception is passed on to allow the application to handle the exception normally.

Figure 2B:
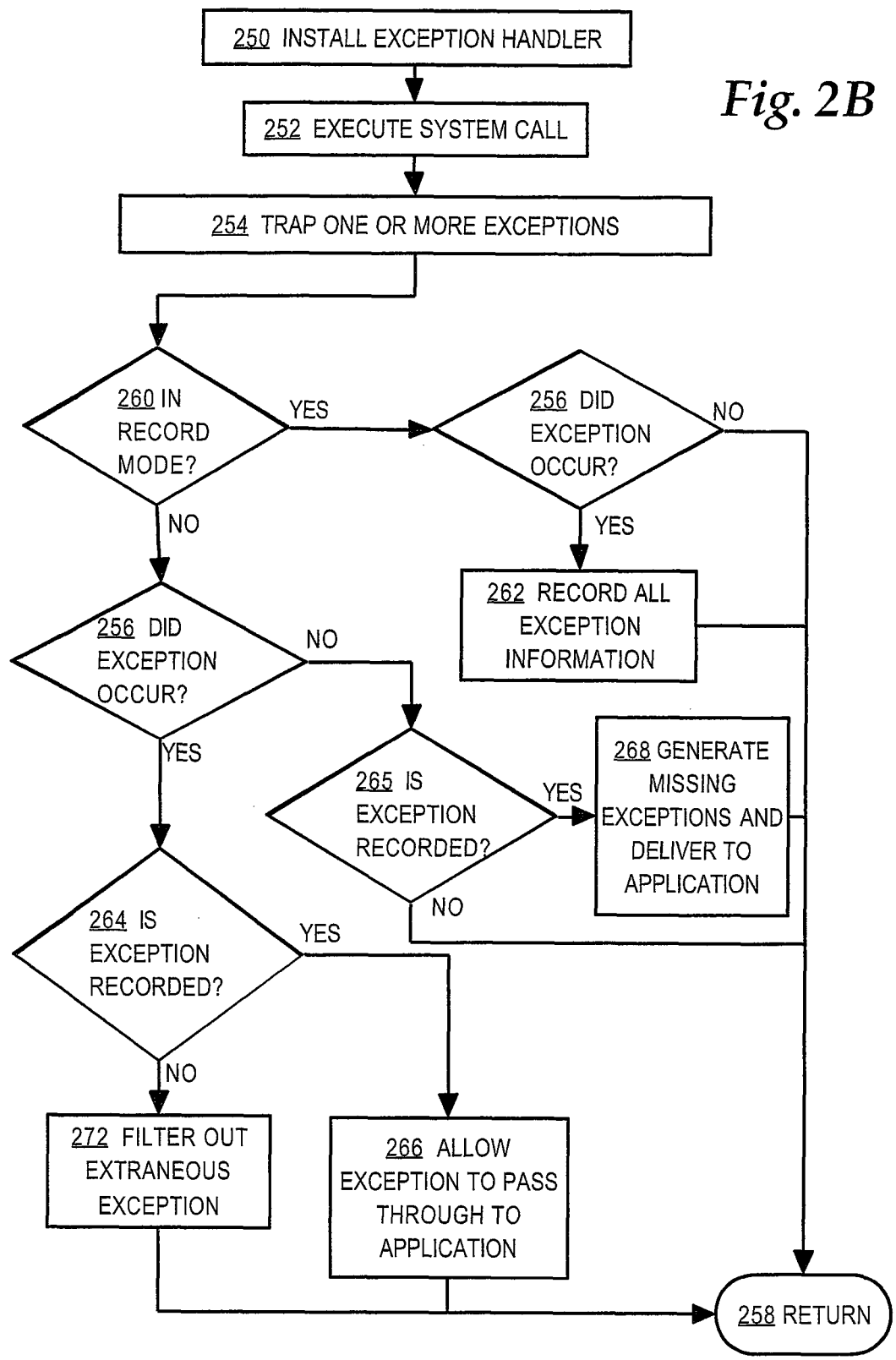
FIG. 2B is a flow diagram illustrating a process of recording and replaying exceptions in one embodiment of the foregoing approaches.

FIG. 2B is a flow diagram illustrating a process of recording and replaying exceptions in one embodiment of the foregoing approaches. In step 250, an exception handler is installed. Step 250 may occur at runtime during either recording or replaying an application. In step 252, a system call is executed. At step 254, one or more exceptions are trapped.

At step 260, a test is performed to determine if the replay system is in record mode. If so, then at step 256, a test is performed to determine if an exception occurred during execution of the system call at step 252. If not, then control returns at step 258. If an exception occurred, then all exception information is recorded in the replay stream at step 262, and control returns at step 258.

If the replay system is in replay mode, then control passes from step 260 to step 256 in which a test is performed to determine if an exception occurred during execution of the system call at step 252. If the exception occurred during replay but was not recorded, as tested at step 265, then in step 268 the missing exception is generated and delivered to the application.

If an exception did occur at step 256 and if the one or more exceptions have been recorded, as tested at step 264, then in step 266 the replay system allows the exceptions to pass through to the application. If an exception occurred at step 256 but no exception is recorded at that point, as tested at step 264, then in step 272 the replay system filters out the extraneous exception and does not pass the exception through.

Thus, during replay, the replay system monitors if the same exact exception is thrown during a function call. If an exception is not thrown, then the replay system can generate a simulated exception using the recorded data from earlier. If an exception is thrown during replay when an exception did not occur on record, the extraneous exception is filtered out and not allowed to pass to the application. Using these techniques, the application will receive the same exception behavior as it did on record.

In one embodiment, some data that the replay system 130 must generate during replay originally contained contextual data during record that was relevant to the application when it was recorded, but will be out of context during replay. For example, exception information may contain memory addresses or window handles that will be different during replay. For these cases, replay system 130 substitutes the original data that was contextual with data that is relevant to the application during replay. To perform such substitution, replay system 130 maps certain memory addresses, window handles, and pointers to other data from what they were during record, to what they are during replay. For example, during record, an application may create a window and the operating system assigns the window a window handle of value 0×5. However, during replay, when the application creates the window, the OS may assign a window handle of value 0×8. Therefore, replay system 130 stores the values and changes 0×5 to 0×8 when appropriate during replay.

3.1.3 Recording Thread Context Switches

According to one embodiment, thread context switches occurring during program execution are recorded and replayed. In this description, "thread context switch" refers to an operation of a data processor when the processor changes attention from one executing program thread to another thread. The order of thread context switching can be important, for example, when data is exchanged between threads. In one embodiment, only thread context switches associated with data exchanges are recorded and replayed. This constraint has been found appropriate because recording all thread context switches would consume an impractical amount of memory.

One embodiment involves identifying methods that are called to share data between threads, and recording only information about the called methods and the sync point at which such calls occurred. Methods that are called to exchange data between threads are termed thread sync points herein. Thread sync points have been found to occur only when an application calls an operating system function that performs resource locking. Thus, examples of thread sync points include methods that result in an operating system locking certain resources, such as Lock, TryLock, and Release methods; methods associated with waiting on or signaling program events, such as Event Wait, EventSignal, WaitForMultipleEvents, WaitForSingleObject; and methods that signal entering or exiting critical sections of executable code, such as EnterCriticalSection and LeaveCriticalSection.

Recording such method calls and associated thread sync points ensures that such methods are called in the same order upon replay. Therefore, an embodiment can ensure that a program binary processes data in the same way upon replay as the data was processed at the time of recording. In particular, the program binary has access to the same resource at the same sequence point, and therefore in the same resource state, at replay as upon recording.

FIG. 2C is a block diagram illustrating how thread context switches are recorded. A replay system 130 monitors accesses of a first thread 202 and a second thread 204 to a shared resource 132. Line 206 represents a progression of time from left to right in FIG. 2C.

The second thread 204 issues a resource request 207 and obtains a lock or control of resource 132 at a first sync point 208, which replay system 130 records. First thread 202 then issues a resource request 209 to acquire a lock for the same resource. Although resource request 209 may require a processor to switch context from second thread 204 to first thread 202, any such switch is necessarily temporary because the processor cannot give control of the resource 132 to the first thread when the second thread is holding control. The processor places the first thread 202 in a queue identifying threads that want the resource. Therefore, replay system 130 does not record a context switch at the time of request 209.

Second thread 204 then issues a resource release 210 for the shared resource 132, allowing the processor to dequeue first thread 202 and give the first thread control. Therefore, replay system 130 records a second sync point 211 reflecting a change in control of the resource 132. Second thread 204 later issues a resource request 212 for the resource 132, but the processor cannot grant control of the resource to the second thread. Therefore, recording system does not record a context switch at that point.

First thread 202 issues a resource release 214, and in response the replay system 130 records a context switch at a third sync point 216, because second thread 204 gains control of the resource. Second thread 204 issues a resource release 218 at a fourth sync point 220, which is recorded.

Figure 10:
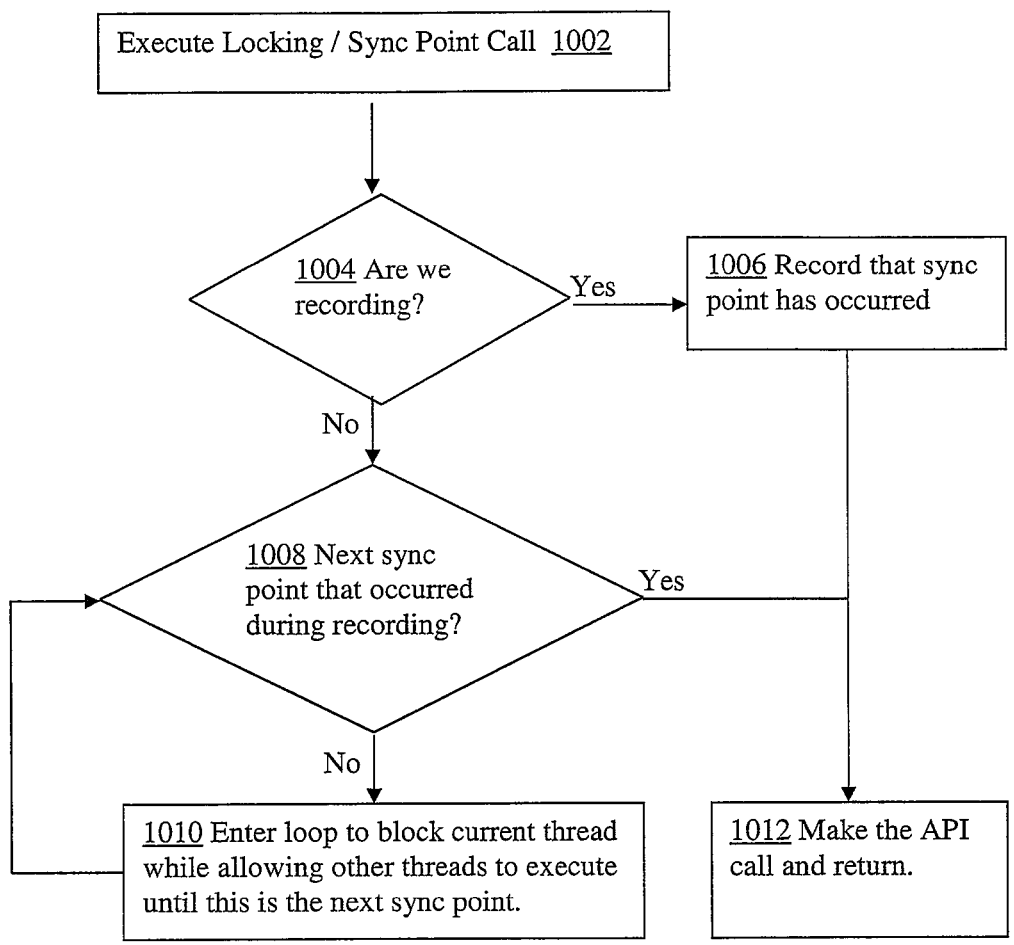
FIG. 10 is a flow diagram of a method of processing program calls that relate to thread context switching.

In one embodiment, during replay, the replay system 130 monitors application execution and intercepts each application call to an operating system function that involves resource locking or release. FIG. 10 is a flow diagram of a method of processing program calls that relate to thread context switching. In step 1002, a program binary attempts to execute a resource locking or other call at a sync point. Replay system 130 intercepts the call. If recording is occurring, as tested at step 1004, then in step 1006 the current sync point is recorded, and at step 1012 the replay system makes the operating system API call on behalf of the program binary. If recording is not occurring, then control transfers to step 1008, which tests whether the next sync point that occurred during recording has arrived. If the next sync point has arrived, then in step 1012 the OS API call is made. If not, then in step 1010 a loop is entered that blocks the current thread while allowing other threads to execute until the next recorded sync point occurs.

Thus, replay system 130 determines the then-current sync point at which such a call occurred, and compares the current sync point to a replay sync point for the next call represented in the recorded replay stream data. If a match occurs, then the replay system 130 allows the call to pass through to the operating system. If no match occurs, replay system 130 blocks the call and enqueues the call in a waiting queue until the correct sync point arrives. A call is allowed to proceed only at the correct sequence point. This approach ensures that a particular thread only receives a lock on a resource at the same order in execution on replay that the thread received the lock when execution was recorded.

Notably, replay system 130 can determine whether a resource lock or release should occur only when the application calls a non-deterministic system API call such that the replay system acquires control of execution and can make the appropriate decision. When the application is executing instructions other than non-deterministic system calls, the replay system 130 does not affect application execution.

Thus, the approach herein focuses on recording a sequence of resource locks that occur for a shared resource, rather than the particular time at which locks and releases occurred. By recording information about lock methods and releases, and the sequential sync points at which locks and releases occurred, replay system 130 can accurately replay the order of program execution.

3.1.4 Shared Memory Access

According to one embodiment, accesses of application processes to shared memory are monitored using a recording system API. Thus, developers who are preparing source code of programs under test include calls to an API associated with replay system 130 whenever access to shared memory is needed. Adding the API calls to program source enables replay system 130 to monitor shared memory accesses at runtime when a program binary based on the program source is compiled and run.

3.1.5 Memory Management

In one embodiment, replay system 130 includes mechanisms for accurately replicating the contents of main memory of a hardware system on which the program binary runs when execution is recorded and replayed. Accurate memory replication provides accurate reproduction of memory leaks, for example, if memory leaks exist as a result of program operation. Accessing un-initialized memory may result in very non-deterministic behavior from an application. The application may crash, or make logic decisions based on bad data. Reproducing this behavior is difficult because the state of un-initialized memory is non-deterministic. Further, in the context of developing game systems, accurate memory replication enables replay system 130 to reproduce any code that has data sorted by pointers. Typically, in game systems a game engine's main loop involves iterating over game objects that are sorted by their memory address.

In an embodiment, replay system 130 establishes a private, controlled memory heap that is used to satisfy all requests for memory allocation that the program binary issues. Replay system 130 intercepts all memory requests that the program binary issues to the operating system, and redirects such requests to the private memory heap. Examples of memory request operations include HeapAlloc, VirtualAlloc, etc. The foregoing approach isolates memory requests and prevents non-deterministic system calls from making memory allocations "under the hood" or without informing the program binary.

Further, in an embodiment, replay system 130 tracks all memory allocation requests that an operating system or hardware platform requests a program binary to issue during execution. For example, in the context of game development, certain game console systems may request a program binary to provide and manage memory. A specific example is the XMemAlloc call on the Microsoft XBOX platform. Replay system 130 records information identifying all such requests as part of a replay stream, and upon replay, the recording system simulates such requests. The requests are satisfied using a dummy memory heap, but processing such requests insures that the game heap is preserved.

3.1.6 Efficient Storage of Replay Data

In one embodiment, replay system 130 implements mechanisms providing efficient storage of replay data representing an execution session of a program binary. According to a first mechanism, only non-deterministic function calls are recorded. Most function calls that a program binary issues are deterministic in nature, and there is no need to record them, because issuing the same calls at replay time necessarily causes the same result in program output or state change.

According to another mechanism, program binaries that issue a rapid succession of clock sampling calls are subject to sample throttling upon recording. In sample throttling, replay system 130 records only a specified maximum number of clock sampling calls within a particular time interval, rather than the actual number of such calls that the application issues. This approach appropriately reduces the number of clock sampling calls in a replay recording, based on the recognition that there is often no need for a program binary to access a time value more than a few times per second or, in the context of game development, each time the video buffer is drawn to the screen (e.g., each frame). Additionally or alternatively, sample throttling is activated only in response to specified user input or in response to a configuration command. Therefore, for certain purposes sample throttling can be turned off. High-performance profiling is an example application in which turning off sample throttling may be beneficial.

As another efficiency mechanism, in an embodiment, replay system 130 buffers replay data as the data recorded using a replay data buffer 134 (FIG. 1A), and flushes the replay data buffer to persistent storage 136 only when necessary. Replay data buffer 134 is maintained in main memory of the platform that is running the program binary, and persistent storage 136 is any non-volatile storage media such as disk, flash memory, etc.

In one embodiment, replay system 130 buffers replay data in replay data buffer 134, and flushes the replay data buffer to persistent storage 136 in response to expiration of a periodic timer or in response to a critical event. For example, exceptions or an exit of the program binary may trigger flushing replay data to persistent storage. In an embodiment, the instrumentation step of FIG. 1A involves installing one or more exception handlers or filters of replay system 130 that intercept exceptions and exit events into the program binary. Thus, when a program crash, bug, or other exception arises, replay system 130 is notified and can respond by flushing the contents of a replay data buffer to disk. This approach ensures that replay data is stored when the replay system 130 is used to test an unstable application.

A replay system 130 that implements such efficiency approaches has been found to generate replay data of about 300 kilobytes per minute of program binary execution for a game program. Network-based game programs with simultaneous players may generate more storage. The amount of replay data generated and stored may vary from program to program.

Because replay data is generated efficiently and the resulting replay data files are small, after recording, replay data may be stored using a document control system or code control system that requires checking data in and out as a control measure; replay data can be stored in such a system with a bug report, for the purpose of communicating bugs among developers and quality assurance personnel.

3.2 Replaying a Replay Stream 3.2.1 Replaying on Different Machines

The approaches herein recognize that a recording of program execution is associated with a hardware configuration of a platform that is running a program under test, and that replaying the recording on different hardware may cause inaccurate replay or errors. For example, a recording that includes non-deterministic input from a particular hardware device may be non-reproducible when a user attempts to play back the recording on another system that does not have that hardware device. Therefore, the approaches herein provide a way to account for hardware configuration differences when a recording is replayed on a different machine. The approaches herein also provide ways for synchronizing information describing hardware assets and source code versions in a dynamic, ongoing development environment.

Figure 3:
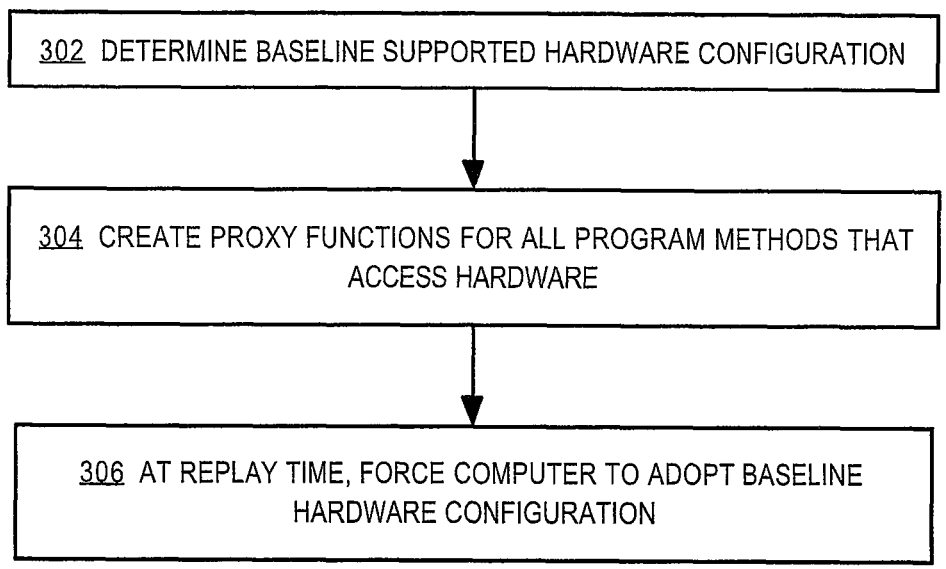
FIG. 3 is a flow diagram of a method for replaying, on a computer having a first hardware configuration, a recording of program execution that was made on a computer having a second hardware configuration.

FIG. 3 is a flow diagram of a method for replaying, on a computer having a first hardware configuration, a recording of program execution that was made on a computer having a second hardware configuration. In step 302, a baseline hardware configuration is determined. For example, a program developer determines a minimum hardware configuration that a particular program under test can support while adequately testing or debugging features of the program.

In step 304, proxy functions are created in the replay system 130. Each of the proxy functions is associated with a program method that accesses or queries a particular specialized hardware feature not found in the baseline platform. For example, one proxy function might intercept program accesses to a graphics-processing unit or to a sound processor that is not part of the baseline configuration.

Upon playback, the proxy function supplies a graceful response to a query to that hardware feature. Thus, in step 306, when a recording is replayed, the program under test is forced to use the baseline hardware configuration that was established in step 302, by interacting with the proxy functions rather than the actual hardware elements that are not available in the baseline hardware configuration. Therefore, a program execution session that was recorded on one machine can be replayed on another, different machine having a different hardware configuration.

In an embodiment, step 306 is optional and is activated in response to a user activating a specified configuration option.

In another embodiment, when a program execution session is recorded, the recording is stored with information identifying changeable assets that the session accessed and version information for the program and for the assets. Examples of changeable assets include data files, configuration files, graphics files, sound files, and other elements that a user or program could modify independent of modifying the program binary.

In an embodiment, the instrumentation step of FIG. 1A installs one or more file I/O proxy functions that intercept and record accesses to the file assets, record what file was accessed, record a version value associated with the file, etc. Using this approach, a complete audit trail is maintained of changeable assets that were used in generating a particular recording.

When the same recording is replayed later, the changeable assets or code are loaded into memory so that they are available for interaction with the program execution session as it is replayed. If a particular asset is not available, not the same version, or otherwise changed at the time of replay as compared to the state of the asset at recording, then replay system 130 issues a warning message or throws an error so that the user is informed that replay execution may not accurately reproduce the same execution session as at recording. In an embodiment, an asset that was accessed from local disk at the time of recording can be accessed from a network location at replay time.

The preceding approach may be implemented using a storage and retrieval module 132 (FIG. 1A) that is integrated into or accessible to replay system 130. Information about accessed assets may be stored on a local machine, local network storage, remote storage, etc.

In an alternative embodiment, a copy of the actual changeable assets is recorded in association with a replay data stream. However, this alternative requires considerably more storage. This alternative may be implemented by receiving user input specifying an execution option for replay system 130, such as in a configuration file, with which a user may specify one or more content files or other assets that are actually recorded as part of the replay data stream.

3.2.2 Fast Forwarding or Skipping State

In an embodiment, upon replay, any program execution function that does not affect the internal state of a program binary can be skipped, for example, in response to user input requesting a skip function or in response to selection of a particular user input device. Examples of program execution functions that do not affect state include any function that provides only output. In the context of a program binary that provides a game, the operation of video screen drawing functions can be skipped. Thus, a user can elect to skip program execution that only involves drawing a complicated video image or series of images. This may enable the user to save a substantial amount of time in replaying a long execution recording.

In an embodiment, a user can skip ahead to a particular point in an execution session by providing user input indicating a request to skip ahead. For example, in one embodiment, replay system 130 periodically stores state point data representing values of all program state values at a particular instant in time and all system state values at the same instant. The state point data essentially represents a snapshot of application state at a particular point in time, and is stored in the replay data stream with information indicating the sync point or time associated with the state. State information may be stored as part of a replay stream or independently. In an embodiment, such periodic storage of state points occurs at regular specified intervals in a recording session, e.g., every five (5) seconds. Any specified interval period may be used.

In one embodiment, the state point data is created and stored after a complete application execution session has been recorded and replay stream data has been stored. Thus, replay system 130 may replay, scan or review an existing set of replay stream data and create and store state point data based on determining how values change upon replay. This approach has the advantage of not interrupting application recording to perform the time-consuming step of creating and storing the state point data. Alternatively, replay system 130 can create and store state point data during recording a program execution session.

Thereafter, at the time of replaying a recording, a user can provide user input indicating a request to skip to the next state point. In response, replay system 130 determines which state point is next, loads all state values for the program binary and the hardware system, sets the state values in the program binary and hardware system under test, and commences continued program execution. In a game system, the user experiences a sudden jump ahead in program execution and the appearance of the video display.

Functions for capturing application state and moving to a particular application sync point or time may be implemented an API that an application can access. State point data may be stored in a replay state file comprising a plurality of type-value pairs that represent program or system variable types and associated values.

3.2.3 Replaying Data Values Read from Non-Initialized Memory

When an application initiates operation, the state of main memory is often unknown. For example, unless the application or an operating system implements some form of memory initialization that sets all memory locations to a particular value, the application cannot assume that memory contains any particular value. According to an embodiment, replay system 130 can replay data values that are accessed from memory having an unknown state at program startup.

Generally, an application must request an allocation of memory that it needs to read or write from a system kernel that implements protected memory. The amount of memory may be large, spanning gigabytes or beyond terabytes. Therefore, recording the contents of such data, as the contents existed at the time of an application execution session, is impractical. In an embodiment, replay system 130 intercepts all such requests. Each time a new address space is first requested, the replay system initializes values in the address space to deterministic values using pseudo-random value generation before allowing the application access to the memory. Later, upon playback, before responding to an address space request, the replay system initializes the requested memory with the same values.

In another embodiment, replay system 130 can simulate a startup system state in which memory contains random, non-initialized data. Such simulation is useful to prevent the replay system 130 from introducing changes in system condition that could affect program execution or performance. Thus, such simulation prevents the replay system 130 from masking problems that may exist when the replay system is not installed or used. Further, the amount of data required to generate the same memory pattern is small, so that recorded replay stream files remain small. Having to record a gigabyte of data from non-initialized memory to replay a requested gigabyte of data is not considered practical in many cases.

Figure 6:
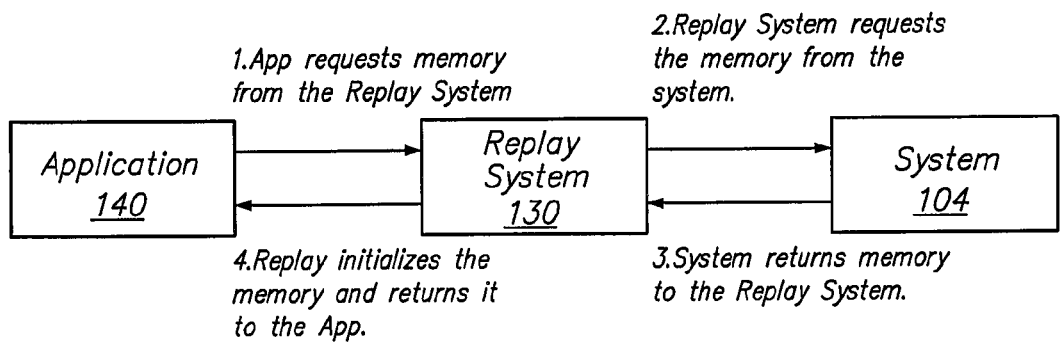
FIG. 6 is a block diagram of an approach for processing application requests for values from non-initialized memory.

FIG. 6 is a block diagram of an approach for processing application requests for values from non-initialized memory. At step 1 of FIG. 6, an application 140 requests values from memory from replay system 130. The replay system 130 intercepts the request, and at step 2 the replay system requests the same memory values from the system 104. The system 104 returns the contents of the requested memory to the replay system 130 at step 3. At step 4, the replay system 130 initializes the memory and returns the memory contents to the application.

According to an embodiment, replay system 130 uses a random seed value and pseudo-random function at step 4 of FIG. 6 to generate an unlimited amount of reproducible simulated memory values. Common program values, such as all unset and set on integer values, are simulated in this approach, and other random values may be simulated. For example, a 32-bit random seed may be generated and recorded as part of the replay stream file. At replay time, the recorded random seed value is retrieved and fed as input to a deterministic pseudo-random function.

The function may be used to generate gigabytes of pseudo-random data that is consistently reproducible whenever the replay stream file is replayed. Because the pseudo-random function is deterministic, the output data is consistent from record to replay. Further, the output data also provides a good approximation of a set of non-initialized data. Moreover, the recorded replay stream file needs to contain only the seed value, not the entire set of generated data; as a result, the technique herein is highly efficient in terms of storage.

In one embodiment, the pseudo-random number generator as defined in a standard operating system library is used to select a random sequence of values that are weighted appropriately.

In another embodiment, each address value is initialized only once. If an application requests the same address value, and then later frees and requests it again, the replay system does not have to reinitialize the address value, since the application will have left the address in a deterministic state.

In one approach, two variables in the replay system track the lowest and highest address values that the application has requested. Each time the application issues a request that is less than the lowest value or greater than the highest value, the variables are updated accordingly. When a memory request is made for an address that lies completely inside the two variables, no new initialization is needed, and the replay system performs no further interaction with the requested memory.

3.3 Example Replay Stream Data Format

Figure 7:
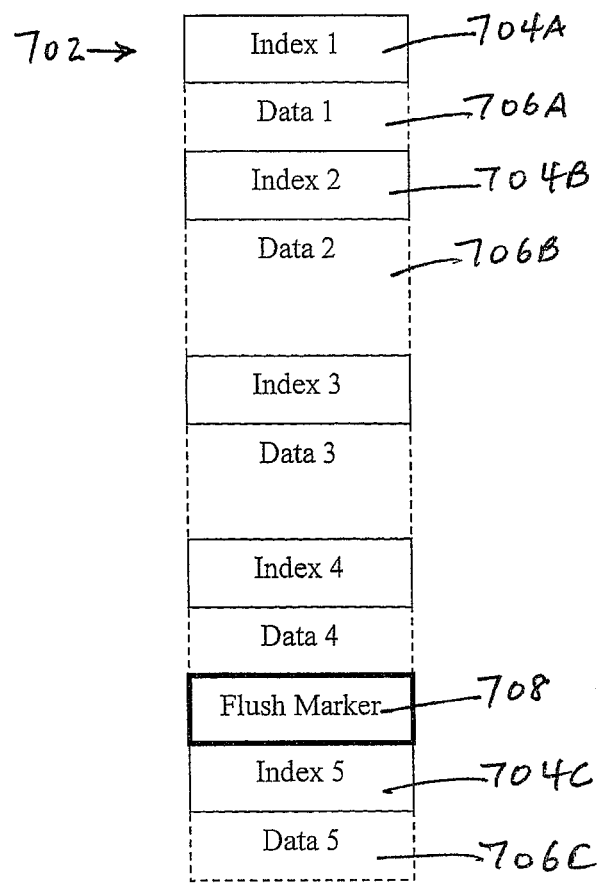
FIG. 7 is a block diagram of an example data format that can be used for storing replay data that is generated as part of recording program execution using the foregoing techniques.

FIG. 7 is a block diagram of an example data format that can be used for storing replay data that is generated as part of recording program execution using the foregoing techniques. In one embodiment, a replay data stream 702 or replay stream file comprises a plurality of index elements 704A, 704B, 704C, etc., a plurality of data elements 706A, 706B, 706C, etc., each corresponding to an index element, and one or more flush marker elements 708.

In an embodiment, index elements 704A, 704B, 704C, etc., and flush marker elements 708 are fixed size. Each of the data elements 706A, 706B, 706C, etc., is variable in size. Each of the index elements 704A, 704B, 704C relates to the sequence of nondeterministic data that is recorded in the stream. Each data element 706A, 706B, 706C has a unique index 704A, 704B, 704C associated with it. Index elements 704A, 704B, 704C typically are sequenced and carry values that increment by one linearly for each data element 706A, 706B, 706C that is recorded. The index elements 704A, 704B, 704C are used during replay mode for verification that an application is executing in the same fashion as it did during Record mode.

Each data element 706A, 706B, 706C relates to a nondeterministic event that occurred during recording. During record mode, data in a data element is collected and written to the replay data stream 702 with an index value. During replay mode, a data element is read from the replay data stream 702 and the data element provides the output of a nondeterministic event back to an application.

The flush marker element 708 indicates a point at which information was written to the replay data stream 702. The flush marker element 708 is used for verification that program execution is the same during replay mode as it was during record mode.

3.4 Approaches for Applying Instrumentation Code to Program Binaries

Generally, applying instrumentation code to a program binary involves changing instructions in the program binary by moving the instructions or redirecting certain instructions to other locations. Some instrumentation may involve modifying relocation tables or segment headers. Instructions are disassembled and instructions associated with non-deterministic input or events are recognized and modified.

Techniques for replacing assembly instructions in-place within an application are now described. In general, replacing assembly instructions as party instrumentation involves how to replace a specific binary instruction while preserving the position and order of all the code surrounding the replaced instruction.

Figure 4A:
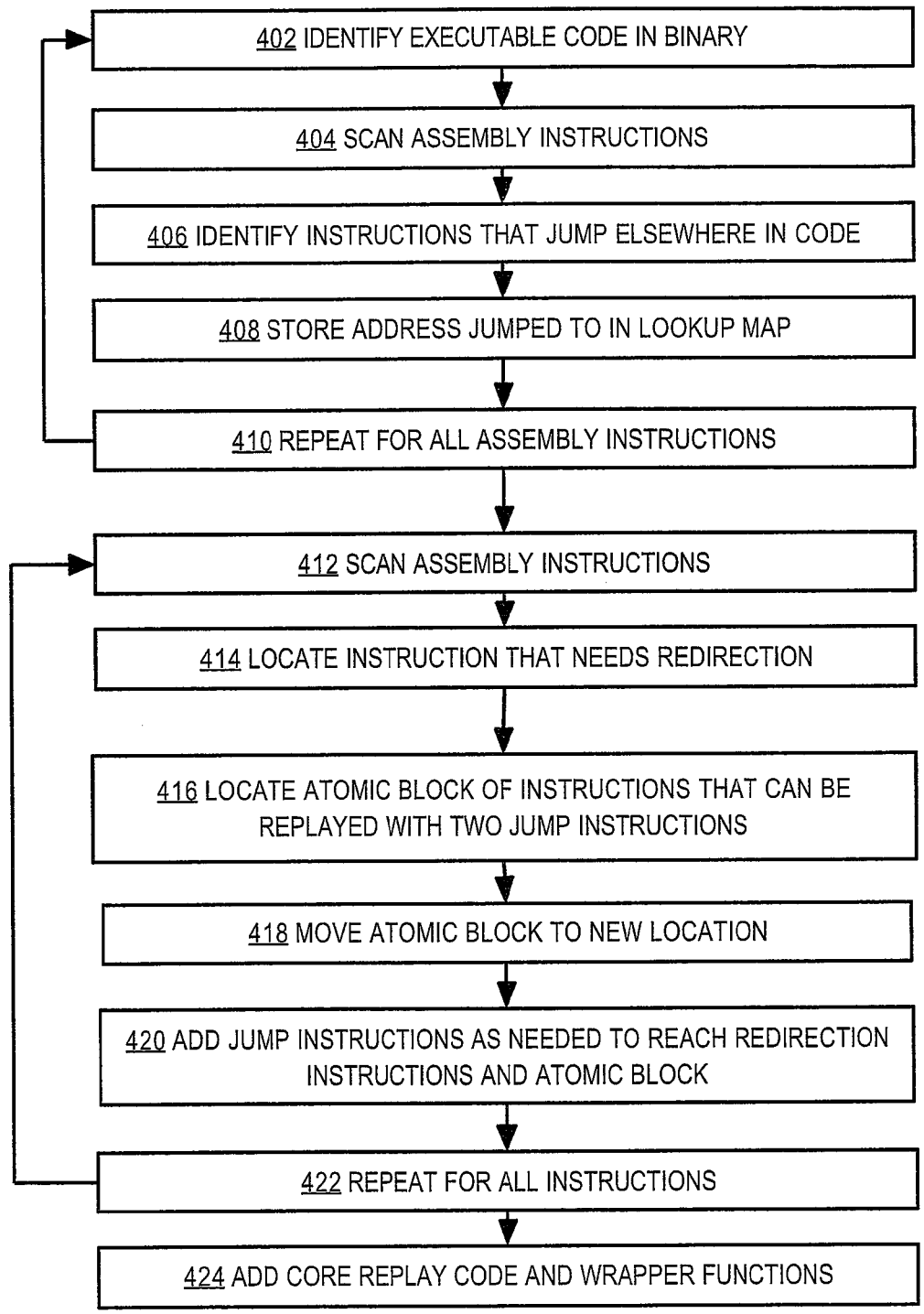
FIG. 4A is a flow diagram of a process of adding replay redirection instrumentation to binary code.

FIG. 4A is a flow diagram of a process of adding replay redirection instrumentation to binary code. In step 402, the executable code in the binary file is identified. A binary file comprises one or more sections, each comprising executable code, data or both. Code comprises binary instructions, which can be disassembled into assembly instructions. Generally, binary instructions in the binary file correspond one-to-one to assembly instructions. Disassembly results in generating a view of the binary file as a linear list of assembly instructions, which may include any instruction that a particular processor can execute. Examples of assembly instructions include MOV, JMP, ADD, etc.

Binary files prepared for different hardware and software platforms may conform to different binary file formats. The description herein assumes that the file format of a particular binary file is known and that a developer has available a software tool that locates and identifies the sections in the binary that contain executable code rather than data. When the executable code has been identified, two passes can be used to introduce redirections in the code that are used as part of the replay system.

Step 404 to step 410, inclusive, represent a first pass that iterates over each assembly instruction looking for instructions that jump into different areas of other code. On a binary file containing instructions conforming to the Intel x86 instruction set, pertinent jump instructions include unconditional jumps and conditional jumps. Each address that is jumped to is stored in a lookup map, which will be used later during a second pass.

In step 404, assembly instructions are scanned. In step 406, the process identifies instructions that jump elsewhere in the code, such as conditional or unconditional jumps. In step 408, each address that is jumped to is stored in a lookup table for later use. In step 410, the process repeats steps 404-408 for all other assembly instructions that are found in the binary file.

Step 412 to step 422 inclusive represent a second pass over the binary file. In step 412, each assembly instruction in the binary file is scanned. In step 414, the process locates an instruction that needs redirection; instructions that do not need redirection are skipped. In one embodiment, instructions that have nondeterministic outputs are selected for redirection into the replay system so that the replay system can record the outputs in record mode, and set the outputs in replay mode. As a specific example, the RDTSC instruction on the x86 processor sets the EAX and EDX registers to nondeterministic values. The replay system can record the values of the EAX and EDX registers and replay the values of the registers when appropriate.

In step 416, the process locates an atomic block of instructions that the replay system can replay with two jump instructions. In this context, an atomic block of instructions is a linear set of instructions that are always executed together in the same order. No other instructions jump into the middle of atomic block, or jump out of an atomic block. An atomic block can be moved to a different address space without causing execution problems or side effects that may change the nature of the program. When looking for a candidate atomic block, the jump lookup table that was constructed in the first pass (e.g., step 408) is used to ensure that no other instructions are jumping into the atomic block.

Figure 4B:
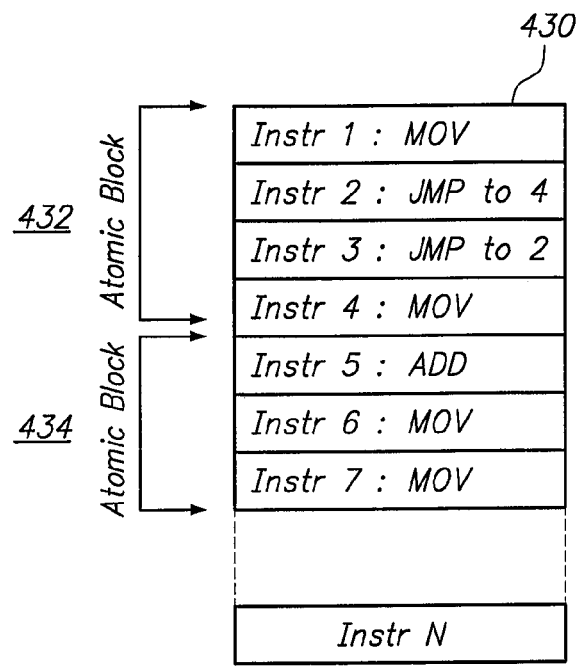
FIG. 4B is a block diagram that illustrates identifying atomic blocks.

FIG. 4B is a block diagram that illustrates identifying atomic blocks. A code segment 430 comprises a plurality of machine instructions denoted Instr 1 through Instr N. A first atomic block 432 comprises instructions Instr 1 through Instr 4, and is considered an atomic block because it contains no jump instructions that jump outside the block, and no other instruction jumps into the atomic block. Similarly, a second block 434 is an atomic block.

In step 416, the atomic block is moved to a new location so that redirection code can be substituted in the binary file at the original location of the atomic block. In an embodiment, an atomic block must be reachable by a small jump statement having a size equal to or less than the size of the instruction that needs to be replaced and redirected.

For example, if the instruction to be replaced and redirected is a two-byte instruction, then that instruction can be moved a maximum of 128 bytes forward or backwards in the code. In that case, at step 414 the process scans the code in both directions and finds the first available atomic block that is reachable and large enough to hold two large jump statements. Two large jump statements are needed to jump into a proxy space associated with the redirection system, because the proxy space may be much further away in the instruction space than 128 bytes. A small jump instruction cannot be used since there might not be enough room to add proxy code.

At step 418, additional jump instructions are introduced into the code as needed to reach new code in a proxy space and to reach the atomic block that was moved at step 416. At step 420, new code is added in the proxy space to redirect non-deterministic functions or output to the replay system.

Figure 4C:
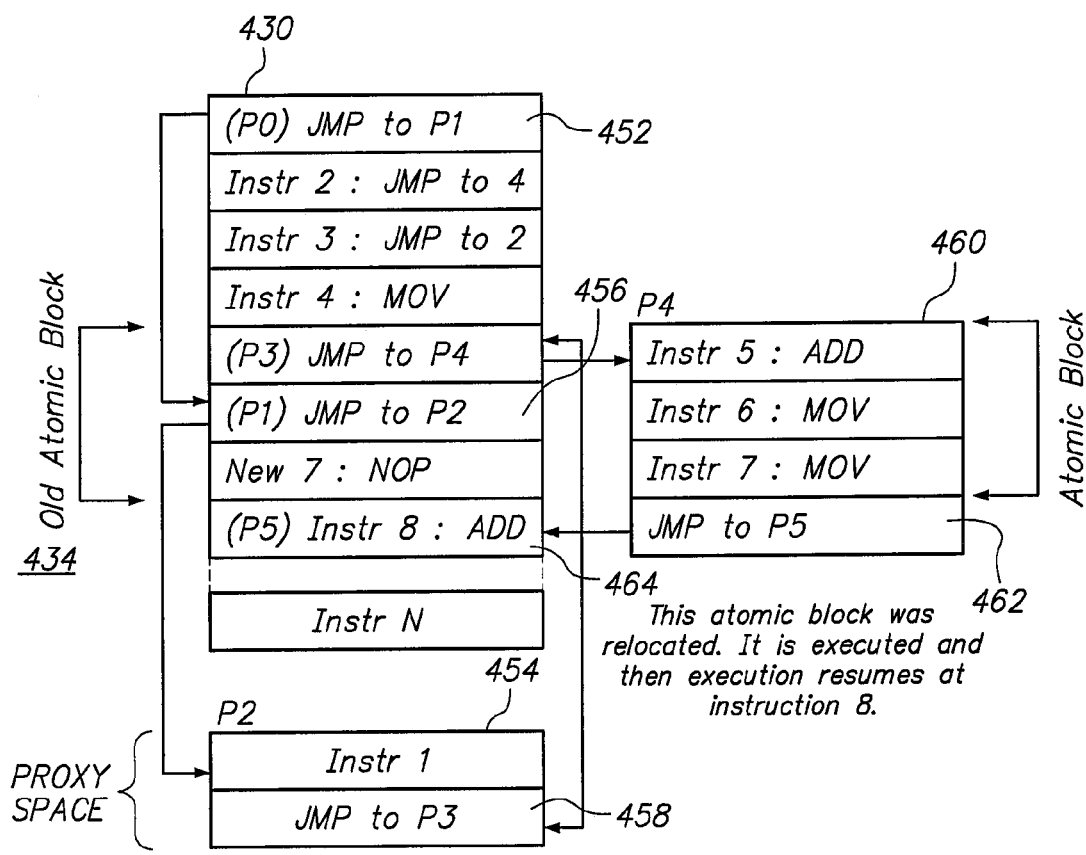
FIG. 4C is a block diagram that illustrates moving an atomic block and inserting redirection code.

FIG. 4C is a block diagram that illustrates moving an atomic block and inserting redirection code. Assume that step 414 of FIG. 4A determines that the instruction Instr 1 of FIG. 4B requires redirection and therefore needs to be moved. Instr 1 is moved to instruction location 454 within a proxy space. A substitute jump instruction P0 replaces Instr 1 at its former location 452 in code segment 430. Instruction P0 provides a jump of 128 bytes or less to instruction P1 at location 456. Execution of P0 causes a processor to transfer control to P1. Instruction P1 is a large jump instruction that can jump into the new replaced code at location 454 in proxy space. The proxy space may contain any amount of code that is necessary for the replay system to record values at that location in program execution.

The new code at location 454 ends at a jump instruction of location 458 that jumps to instruction P3. Instructions P1 and P3 have been inserted in space formerly occupied by atomic block 434, which has been relocated to location 460. Thus, when the proxy space code is executed control transfers to a location after the original position of the replaced instruction. This approach allows the replay system to execute the new replaced instructions.

When location 460 is reached, instructions Instr 5, Instr 6, Instr 7 of the atomic block are executed. The atomic block 434 terminates at a new jump instruction 462 that transfers control back to the end of the original code, at location 464. Execution continues at that point. This approach preserves the original instructions that were displaced from the atomic block. Atomic blocks of instructions may be moved to a different location, and new instructions are inserted, to be executed in place of the atomic blocks. The foregoing approach can redirect any instruction of any length, which is important for processor instruction sets that include variable length instructions. Further, the approach can configure the code to execute any amount of new code upon redirection to the proxy space. The foregoing approach also maintains the integrity of all original instructions of an application.

At step 422, the process of step 412 to step 420 is repeated for all instructions.

At step 424, the process adds core replay code and wrapper functions to the binary file. The core replay code and wrapper functions implement record and replay functions of the replay system.

Figure 5:
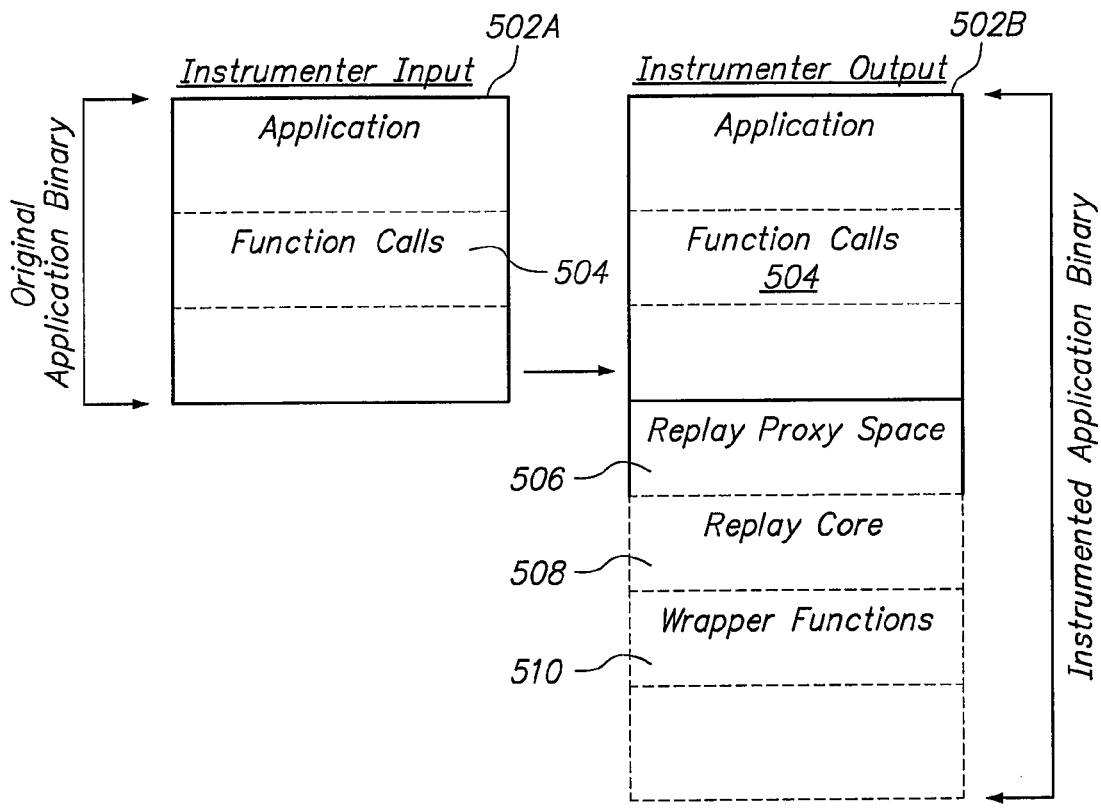
FIG. 5 is a block diagram illustrating transformation of an application binary file into an instrumented application binary file with replay system components.

FIG. 5 is a block diagram illustrating transformation of an application binary file into an instrumented application binary file with replay system components. An original application binary file 502A comprises application code that may include one or more function calls 504. Applying the process of FIG. 4A to original binary file 502A transforms the original binary file to an instrumented binary file 502B that includes a replay proxy space 506, and a replay core 508 having wrapper functions 510.

Replay proxy space 506 includes instructions, such as the instructions of locations 454, 458 of FIG. 4C, that save processor register states, call wrapper functions in the replay core 508, and restore register states. As described above for FIG. 4A, an instrumentation process modifies an application binary file to redirect all nondeterministic calls and instructions first into the appended proxy space 506. The proxy space 506 is used to preserve any state that is specific to the calling code. Such state may consist of registers that must be saved. The proxy call then makes a call into the corresponding function wrapper inside the replay core 508.

Wrapper functions 510 in replay core 508 call system functions on behalf of an application. When the replay system 130 is operating in record mode, replay wrapper functions 510 record all non-deterministic output of the application. Thus, in record mode, the wrapper functions 510 are responsible for recording any nondeterministic data that will be returned by the function inside a replay stream. Further, the wrapper functions 510 implement proxy code for each non-deterministic system method or call that an application may use.

In replay mode, wrapper functions 510 replay non-deterministic output. Wrapper functions 510 also handle asynchronous data updates, and return replayed information to instructions in the proxy space 506 that called the wrapper functions. Thus, in replay mode, the wrapper functions 510 are responsible for writing the same data that was recorded into the output data. The wrapper functions 510 then returns control to the proxy space 506, which restores any state that was saved before entering the wrapper functions. In many cases, the proxy call may be skipped, and the function call can be redirected directly into a wrapper function residing in the replay core 508. This approach is appropriate if no state needs to be preserved or restored, based on the nature of the call.

The replay core 508 also implements miscellaneous functions to support the function wrappers. For example, code in replay core 508 creates and prepares a permanent storage area to save the replay data. In an embodiment, the storage area is accessed using a streaming mechanism. When the storage area is ready, the replay core 508 moves nondeterministic data that is recorded from the function wrappers and writes the data to the streams. The streams may interact with a file system on a hard disk or other medium, or interface with a remote network server on a LAN, WAN or the Internet.

Replay core 508 also implements callback managers and other logic to support recording and replaying asynchronous function calls using the approaches described above. Replay core 508 also implements logic for performing thread context switching, interrupt trapping, and other recording and replay functions previously described.

Replay core 508 also implements state recording functions that store type-value pairs for program variables or system variables that represent program state or system state, in association with sync point values representing the time at which a state change occurred. State values are stored only when a state change occurs rather than all state values associated with all method calls of an application. In effect, this approach imposes a throttling effect that reduces the amount of stored data associated with capturing repeated application calls to functions that do not result in any state change.

In replay mode, replay core 508 is configured to open a specified replay data storage file, and then read in the requested nondeterministic data from the stream for the function wrapper. The replay core 508 also is responsible for checking that the application binary is compatible with the selected replay stream.

4.0 Software Development Management Using Replay System 4.1 User Interface Example In an embodiment, the replay system 130 is implemented in a set of program and data files that a developer uses to develop, test or debug applications. In one particular embodiment, described in this section, the replay system 130 is used to develop game applications. This section describes an example installation and user interface mechanism for using an implementation of the replay system 130 with the Microsoft XBOX platform; other embodiments may be implemented, installed and used in a different manner for different platforms. Thus, this section merely presents one example, and is not intended to limit the scope of all possible embodiments.

A set of distribution files comprising replay system 130 is normally placed in a build tree with other third-party tools or APIs that a developer may be using with an XBOX title. For example, the replay system distribution may be stored in a folder named C:/MyTitle/3rdParty/Replay. A user extracts or installs distribution files of replay system 130 to this directory. The user may add the 'Lib' directory to a lib path, and the 'Include' directory to the include path so that the user's compiler can find replay system 130 libraries and include files. Alternatively, the user can use full paths when referencing the libraries and header files.

To record and playback sessions, it is necessary to install replay system 130 on a game title that is under development. In an embodiment, installation comprises adding binary instrumentation to an executable of the game title, so that no source code changes are required. In an embodiment, installation comprises disassembling the binary executables (such as EXE and DLL files), identifying the points in the binary files that require patching, and making small modifications to the binary files to alter the code in order to allow the instrumentation to capture, record and ultimately replay data.

In another embodiment, installation comprises:
1. Make the first line of code that the title executes in main( ): ReplayStaticInit( );. This line can be placed in an #ifdef statement with a REPLAY option.
2. Include 'ReplayLib.h' in the same C or CPP file as main( ). For example:
   #include "c:/MyTitle/3rdParty/Replay/Include/ReplayLib.h"

If the title is single-player and does not link against XOnline.lib, then statically link against only the following libraries: ReplayCoreModules-Xbox.lib; ReplayCore-Xbox.lib. If the title is multi-player, or links against XOnline.lib, then statically link against only ReplayNetworkModules-Xbox.lib and ReplayCore-Xbox.lib. A title must link against either ReplayNetworkModules-Xbox.lib or ReplayCoreModules-Xbox.lib, but not both at the same time.

3. Edit 'Ini/replay_app_xbox.ini' and change the 'launch_xbe' option to the name of the title's XBE.
4. Compile the title, and run 'ReplayInstrumenter.exe' on the compiled EXE. The ReplayInstrumenter program performs an instrumentation process on the executable binary file. Instrumentation processes are described further herein in other sections. A sample 'Instrument.bat' file included gives an example of using this command. A copy is reproduced at Table 1A. The developer should edit this script for the title and run it as the last step in the build process.
5. Create an XBE image normal using the instrumented EXE from the previous step. This is done with the 'imagebld' XBOX utility. Edit the sample 'Instrument.bat' script included with the replay system 130 to automate this step for the title.
6. Using the 'Instrument.bat' script, deploy the XBE and Replay config files to the XBOX.

TABLE 1A

EXAMPLE INSTRUMENT.BAT FILE

```
@echo off
REM
**************************************************************************
*
REM
REM This script will instrument your target application with
ReplayDIRECTOR,
REM as well as place config files on the default target Xbox.
REM
REM 'REPLAYDIR' is where Replay files are located.
REM 'TARGETDIR' is the directory containing the target EXE.
REM 'TARGETEXE' is the EXE that will be instrumented. Not a full path,
just the EXE name.
REM 'DESTEXE' is the instrumented EXE location. Specify a full path if
you wish.
REM 'DESTXBE' is the XBE image created from the instrumented DESTEXE.
Use a full path.
REM
REM NOTE: This script can be run from any directory.
REM NOTE: '%TARGETDIR%\%TARGETEXE' should point to your target EXEs full
path.
REM
REM
**************************************************************************
*
set LOCALVOL="C:"
set REPLAYDIR=%LOCALVOL%\Projects\ttl\Replay
set XBOXDESTPATH=xe:\ttl\
set TARGETDIR=%LOCALVOL%\Projects\ttl\ttl\code\XBoxRelease
set TARGETEXE=ttl.exe
set DESTEXE=ttl.exe
set DESTXBE=ttl_release.xbe
echo.
echo.
echo Instrumenting target application with ReplayDIRECTOR...
%REPLAYDIR%\ReplayInstrumenter.exe %TARGETDIR% %TARGETEXE% -out
%DESTEXE% -platform xbox -db %REPLAYDIR% -launch_name %DESTXBE% -force -
embedded_config %REPLAYDIR%\Ini\embedded.ini -no_stack_alloc
echo.
echo Building the XBE image . . .
echo.
imagebld /OUT:"%DESTXBE%" /stack:"65536" /nologo /testid:"0x45530018"
/testname:"25-To-Life" "%DESTEXE%"
echo.
echo Installing XBE and config files on the Xbox . . .
echo.
REM Create the Launcher INI file . . .
echo D:\%DESTXBE% > %REPLAYDIR%\Ini\ReplayLauncher.ini
REM Copy replay files . . .
xbcp /y "%DESTXBE%" "%XBOXDESTPATH%\%DESTXBE%"
xbmkdir "%XBOXDESTPATH%\Replay"
xbcp /y "%REPLAYDIR%\Ini\ReplayLauncher.ini" "%XBOXDESTPATH%\Replay"
xbcp /y "%REPLAYDIR%\ReplayLauncher.xbe"
"%XBOXDESTPATH%\zReplayLauncher.xbe"
xbcp /y "%REPLAYDIR%\ReplayLauncherKeyboard.xbe"
"%XBOXDESTPATH%\zReplayLauncherKeyboard.xbe"
xbcp /ry "%REPLAYDIR%\Media" "%XBOXDESTPATH%\Media"
echo.
echo All done!
echo.
```

In one embodiment, the ReplayInstrumenter program of the replay system 130 provides user options for modifying its operation. Generally, ReplayInstrumenter can be run from any directory. The command syntax is: ReplayInstrumenter <app dir> <app EXE or INI> \ [-out <file>] [-platform <platform>] [-force]. The ReplayInstrumenter has the command line options shown in Table 1B:

TABLE 1B

EXAMPLE COMMAND LINE OPTIONS

| Argument/Option | Description |
| --- | --- |
| <app dir> | The directory where the target application EXE is located. This is usually the output directory. |
| <app EXE or INI> | The filename of the target EXE to be instrumented, without a full path. The instrumenter looks in <app dir> for this file. |
| -out <file> | The destination filename of the instrumented EXE that will be created. This can be a full path. |
| -platform <platform> | This should specify the target platform. (e.g. pc, xbox) |
| -force | This will force the target EXE to be instrumented, even if it appears the destination file is already up-to-date with the target EXE. |

The ReplayInstrumenter must be able to locate the PDB file associated with the target EXE. If the ReplayInstrumenter cannot locate the PDB file, it will display an error indicating where the PDB file should be. Therefore, developers should put the PDB file in the directory indicated by the error message and run the instrumenter again.

By default, replay system 130 records whenever a developer runs a title. Everything is recorded as the game is played, and written to the utility drive. A developer can disable auto-recording by modifying the 'default_record' setting in 'replay_xbox.ini'. If the default recording option is OFF (set to '0'), a user can start a recording session by holding down both triggers and pressing the BLACK button on the controller. This will reboot the XBOX and run the title in recording mode.

Data relating to a session is placed in the 'ReplaySessions' directory located on the Utility Drive. For example: Z:\ReplaySessions\

Replay system 130 saves the last five sessions for each application that is recorded in this directory. Each session is placed in its own directory named '1' through '5'. The most recent session is under a directory named '1'. For example: Z:\ReplaySessions\1

As each new session is recorded, the session number is incremented. '1' will become '2', '2' will become '3', etc. The oldest session, usually '5', will be removed.

To replay a recorded session from the XBOX, the user presses both triggers down while pressing the BACK button. This will replay the most recently recorded session. To replay a recorded session from a debugger (e.g. MSVC), the title is run with the '-replay' command line option. This will replay the most recently recorded session from the debugger. To replay a specific session, the path to the session is specified on the command line with the '-replaySession <SessionDir>' option. For example: myTitle.xbe -replaySession Z:/ReplaySessions/4

While in replay mode, the replay can be controlled using the XBOX controller with the controls shown in Table 2:

TABLE 2

EXAMPLE REPLAY CONTROLS

| Action | Button |
| --- | --- |
| Pause | Y |
| Play | A |
| Slow Playback Down | X |
| Speed Playback Up | B |
| Reboot to Record Mode | Both Triggers & BLACK |

A user may perform debugging during replay. The replay system 130 does not affect the ability to step through source code in any way. The user can set breakpoints, inspect data and perform any normal debugging functions. Using Visual Studio, the PDB files are valid with replay system 130 installed on the application. At any point during the replaying of a session, a user can attach a debugger such as Visual Studio and step through the source code associated with the application.

A user can save a session by copying or moving the session data from the 'Z:\ReplaySessions' directory. The directories listed herein (e.g., Z:\ReplaySessions\1) each contain a replay session.

Replay sessions can be replayed from the command line, or the debugger, using the following command line parameters. To replay the most recent recorded session: xbreboot <TargetApplication> -replay To replay a specific session located on the XBOX utility drive: xbreboot <TargetApplication> -replaySession \ <ReplaySessionDirectory>

For example, to play the most recent recorded session: xbreboot xe:\\myTitle\myTitle.xbe -replay To play any recording on the XBOX utility drive, specify it as: xbreboot xe:\\myTitle\myTitle.xbe -replaySession \ Z:\ReplaySessions\4

In one embodiment, a distribution of replay system 130 includes or uses the files listed in Table 3:

TABLE 3

EXAMPLE DISTRIBUTION FILES

| File | Description |
| --- | --- |
| ReplayInstrumenter.EXE | The instrumenter application that is run to activate the replay system on a title. |
| Instrument.bat | A sample batch file demonstrating how to apply ReplayDIRECTOR to a title. Typically this is run as the last step in a build. |
| Include/ReplayLib.h | Header file that is included to call ReplayStaticInit( ) from main( ). |
| Ini/replay_xbox.ini | Config file containing general Replay options. Generally does not need to be edited. |
| Ini/replay_app_xbox.ini | Config file containing options specific to a title. A user may need to customize these settings for a title. |
| Lib/RepayCore-Xbox.lib | This lib is always statically linked to a title. |
| Lib/ReplayCoreModules-Xbox.lib | This lib is linked for most single-player games. |
| Lib/ReplayNetworkModules-Xbox.lib | This lib is linked for most multi-player and XboxLive games. |
| Z:\ReplaySessions\ (On the XBOX Util Drive) | This is the directory where recorded session data is placed. Each session is stored in a separate directory. Only the five most recent sessions are stored in this directory. |
| Z:\ReplaySavedSessions\ (On the XBOX Util Drive) | This is the directory to store recorded sessions to maintain on long-term basis. A user can place any number of recorded sessions in this directory. |

4.2 Example Bug Communication Process

The approaches herein provide numerous benefits to users. Bugs may be corrected far more rapidly than in prior approaches. The approaches herein also facilitate communicating bugs from one unit of an enterprise to another, such as from a QA team to a development team. One unit can transmit, using e-mail for example, a copy of a replay stream to another unit for replay at that other unit's location.

Figure 8:
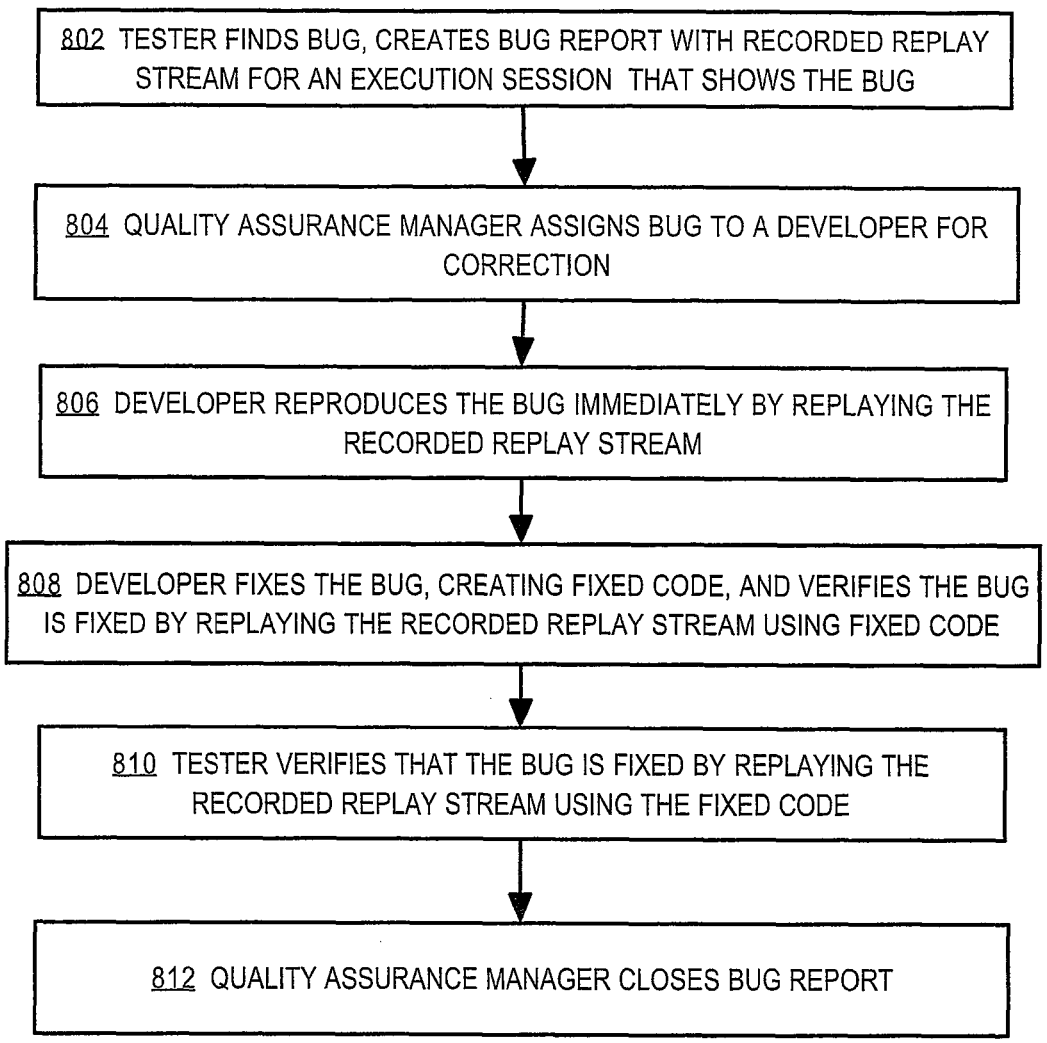
FIG. 8 is a flow diagram of an example software development management process according to an embodiment.

FIG. 8 is a flow diagram of an example software development management process according to an embodiment. In step 802, a software program tester finds a bug in an application program, prepares a recording of program execution that shows the bug using the replay system 130, and creates a bug report in association with a recorded replay stream. In step 804, a quality assurance manager assigns the bug to a developer for correction. Such an assignment can include communicating the bug report with the recorded replay stream. Thus, in the bug report, the tester and QA manager do not have to prepare a detailed description of how to reproduce the bug.

In step 806, the developer reproduces the bug by replaying the recorded replay stream. Step 806 presumes that the developer also runs the replay system to produce an instrumented application binary file that is equivalent to an instrumented binary file that the tester used when the bug was found at step 802. However, by playing the replay stream received with the bug report, the developer can reproduce the bug immediately without having to manipulate the application in a special way or provide particular input.

At step 808, the developer fixes the bug, resulting in creating fixed application code. The developer verifies that the bug is fixed by replaying the recorded replay stream using the fixed code. The developer also may communicate a copy of the fixed application code to the QA manager or tester.

At step 810, the tester verifies that the bug is fixed by replaying the previously recorded replay stream using the fixed code. If the bug is fixed, then replaying the recorded replay stream does not produce the bug. At step 812, the QA manager closes the bug report.

4.3 Other Uses and Benefits

The approaches herein enable performing memory and performance profiling. Because the approaches provide a consistently reproducible run-through of a program, the program can be tested on different platforms that may affect performance, and the approaches help isolate non-deterministic events or platform components that affect performance. For example, developers can repeatedly replay the same execution session while modifying application methods, functions or parameters and can observe the effect of such changes.

The approaches herein can be used to create foolproof demonstrations of computer programs. A user can record a demonstration session with a program at one point in time, and replay the demo later with assurance that the integrity of the demo cannot be affected by variances in input or by human error in running the demo.

The recording system provided herein has little performance impact on a program under test when the program is executing. Performance impact is important, for example, for development of game programs, in which a large amount of video information is generated and smooth, fast refreshing of the video display is essential for a good user experience. An embodiment has been found to result in no noticeable drop in the output frame rate of a typical game program.

No change in the software development workflow process is required; for example, developers do not need to use APIs in developing source code of applications.

Memory usage of embodiments is low. For example, an embodiment implemented on the Microsoft Xbox has been measured to require about 500K to 700K of main memory for execution. Data output of embodiments is also relatively small. For example, an embodiment has been found to generate about 1 MB of replay stream data per minute of program execution. The small, efficiently generated replay stream data files associated with embodiments enable users to conveniently transport replay stream data files to others.

5.0 Memory Management and Thread Management Techniques 5.1 State Synchronization Techniques Computer programs are increasingly developed for use on computer hardware platforms that use multiple processors or processors with multiple cores. Examples include computer game platforms such as PCs, XBox360, and PS3. In these systems and other systems, certain memory write operations may represent non-deterministic state changes that can be recorded and replayed to provide an accurate picture of program execution behavior. Certain memory write operations also may be associated with programmatic "race conditions" in which two or more program execution threads access the same memory location at close to the same time, and one or more of the threads is writing the location.

Accurately replaying a recording of execution of an application program involves ensuring that the application execution path is preserved upon replay precisely and with few exceptions. Detecting the source of an execution path that diverges, upon replay, from a path followed upon recording can be tedious and time-consuming. There may be thousands of sources of such divergence, and the application program may be embedded in a host system such that source code is not available.

In one approach, detecting divergence includes observing the application program making different application function calls or system calls at the time of recording and the time of replay. When a divergence point is identified, a long, manual process is typically used to locate the condition(s) that caused a different execution path. However, these conditions may have occurred millions of instructions earlier in execution, and tracing the divergence path backward to the original location may take an insurmountable amount of backward detection or simulation.

Alternatively, the source of divergence is identified at the earliest possible point by detecting when any state of the application program becomes different. Only different state can cause an application program to execute differently upon replay and recording. Therefore, identifying an initial state difference is an efficient means of detecting divergence, because divergence is detected at the source rather than observing the after-effects of divergence. The state of all application memory is a part of application state.

In an embodiment, these issues are addressed by a replay write exception process that can detect memory write operations that cause state changes, and can assist in identifying race conditions that may be indicated by memory operations of multiple threads occurring close in time.

Figure 11A:
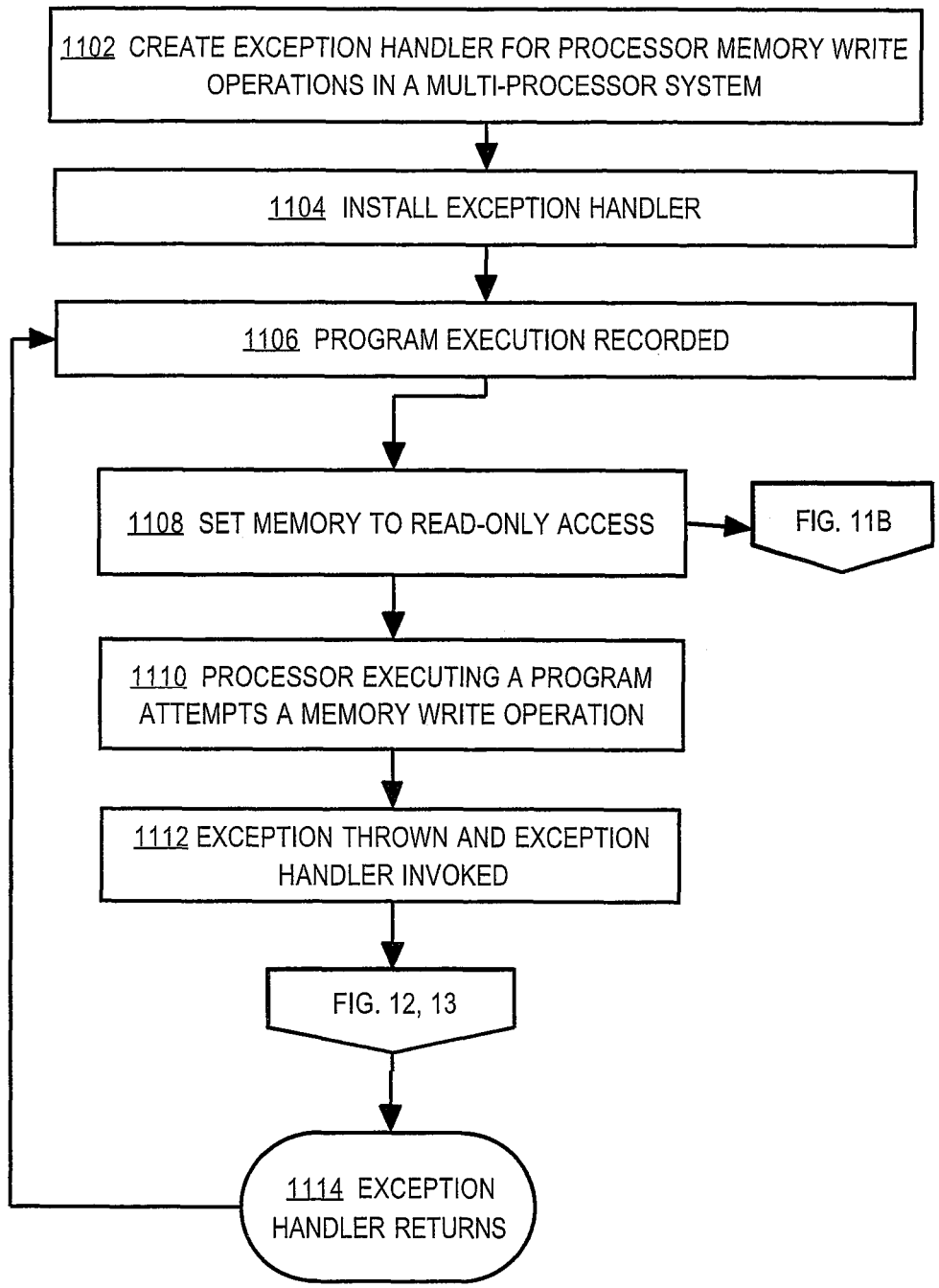
FIG. 11A is a flow diagram of an overview of a write exception process in one example embodiment.

FIG. 11A is a flow diagram of an overview of a write exception process in one embodiment. For purposes of illustrating a clear example, FIG. 11A and the other drawing figures referenced in this section are described with reference to FIG. 1B. However, the general approaches described herein may be used in many other contexts and are not limited to FIG. 1B. In particular, while FIG. 1B illustrates a game binary 140, the approaches herein may be used with any form of application program including applications other than games.

In step 1102, an exception handler for processor memory operations is created. The exception handler is installed at step 1104. At some point thereafter an application program under development, test, debugging or other observation executes and program execution is recorded at step 1106 using the techniques described herein in sections 2 and 3.

At step 1108, a portion of main memory of the computer platform that is under development, test, debugging or other observation is set to read-only access. One technique for setting memory to read-only access is provided in FIG. 11B.

At step 1110, a processor executing an application program attempts a memory write operation. The effect of setting memory to read-only access is that when an application program attempts to perform a write operation on the memory, the computer platform throws a hardware exception at step 1112 that invokes the exception handler that was installed at step 1104. In various embodiments, the approaches of FIG. 12, FIG. 13 can be used to implement an exception handler and perform state synchronization or race condition detection operations. At step 1114, the exception handler returns control. Control transfers to step 1106 at which continued program execution recording occurs at step 1106.

Figure 11B:
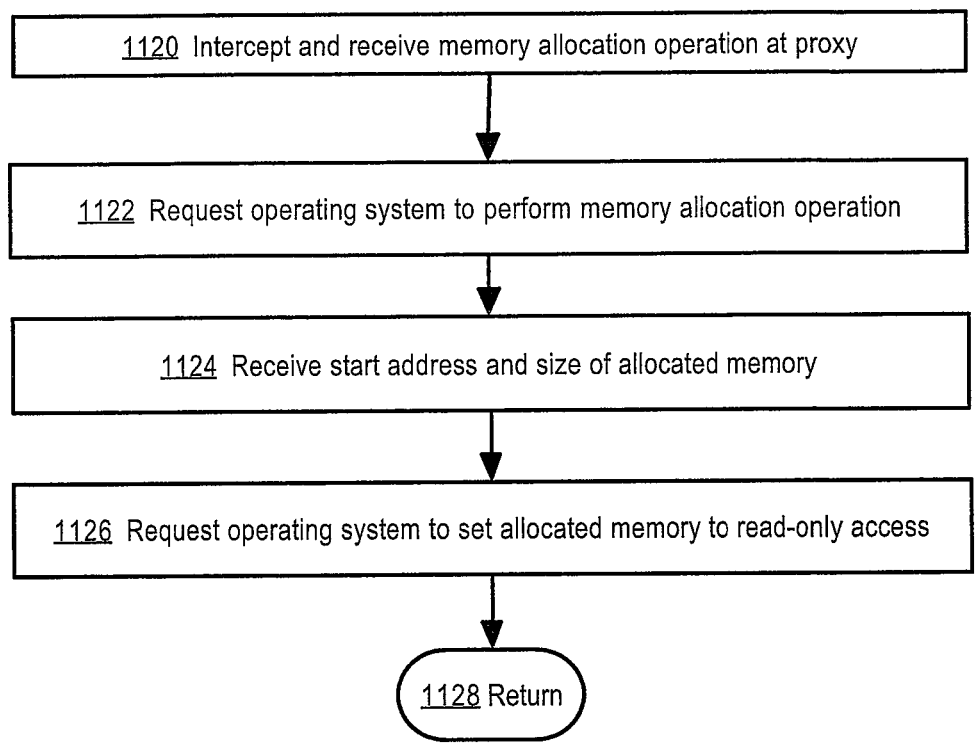
FIG. 11B is a flow diagram of a process of setting memory to read-only access in one example embodiment.

FIG. 11B is a flow diagram of a process of setting memory to read-only access in one example embodiment. In step 1120, a memory allocation operation is intercepted and received. For example, in the arrangement of FIG. 1B, an application program such as game binary 140 executes on kernel/OS 104 and issues a memory allocation instruction that seeks to allocate memory. The instruction may be a "malloc" instruction or a functionally similar instruction in a different instruction set. The memory that is identified in the instruction may be heap memory or static memory in various embodiments. Recording system 130 intercepts the memory allocation instruction, acting as a proxy for the computer system 100.

At step 1122, the operating system is requested to perform a memory allocation operation. The memory allocation operation specifies a requested size or amount of memory to be allocated. For example, an allocation operation could request 1 MB of memory. In an embodiment, recording system 130 executes a memory allocation instruction on processor 102 on behalf of the application program. The processor 102 performs the memory allocation instruction and allocates memory, returning a starting address and a size of the memory that was allocated. Thus, in step 1124, a start address and size of allocated memory is received.

In step 1126, the operating system is requested to set the allocated memory to read-only access. In an embodiment, recording system 130 invokes functions of operating system 104 that set permissions on the allocated memory to read-only access. In step 1128, the process returns control to a calling process. Step 1128 may include returning the start address and size of memory that was allocated. Thus, in an embodiment, the allocated addresses received at step 1124 are returned to the application program so that memory allocation instruction originally attempted by the application program appears to have been performed normally.

In an alternative approach to FIG. 11B, upon startup, recording system 130 scans all virtual address space that is available to the application program on computer system 100. Scanning the virtual address space may be performed using virtual query methods, such as the method VirtualQuery under Microsoft Windows. For each virtual memory segment that is associated with a code module, the virtual pages are made read-only so that writing the pages will generate an exception.

In the alternative approach, after startup, system calls of the application to load in new code segments and static memory are intercepted. When a new module is loaded into application virtual memory, recording system 130 scans each virtual segment and sets the virtual protection permissions to read-only.

Figure 12A:
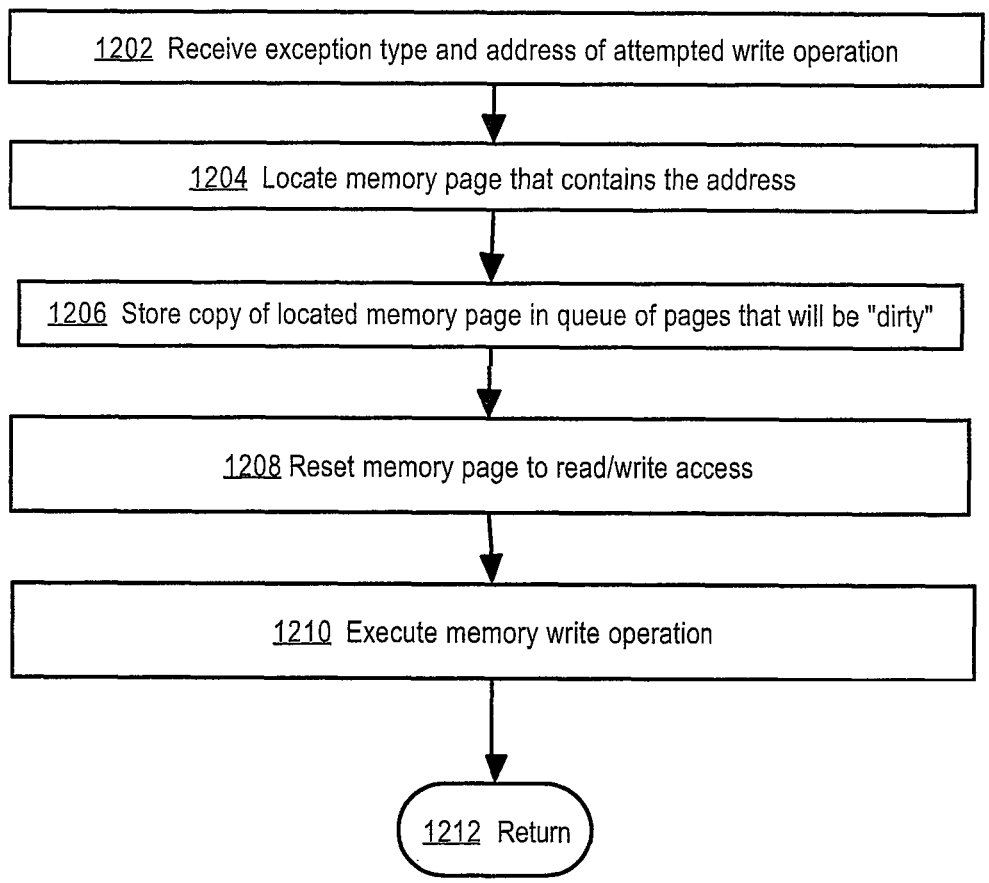
FIG. 12A is a flow diagram of an example exception handler process for use in state synchronization.
Figure 12B:
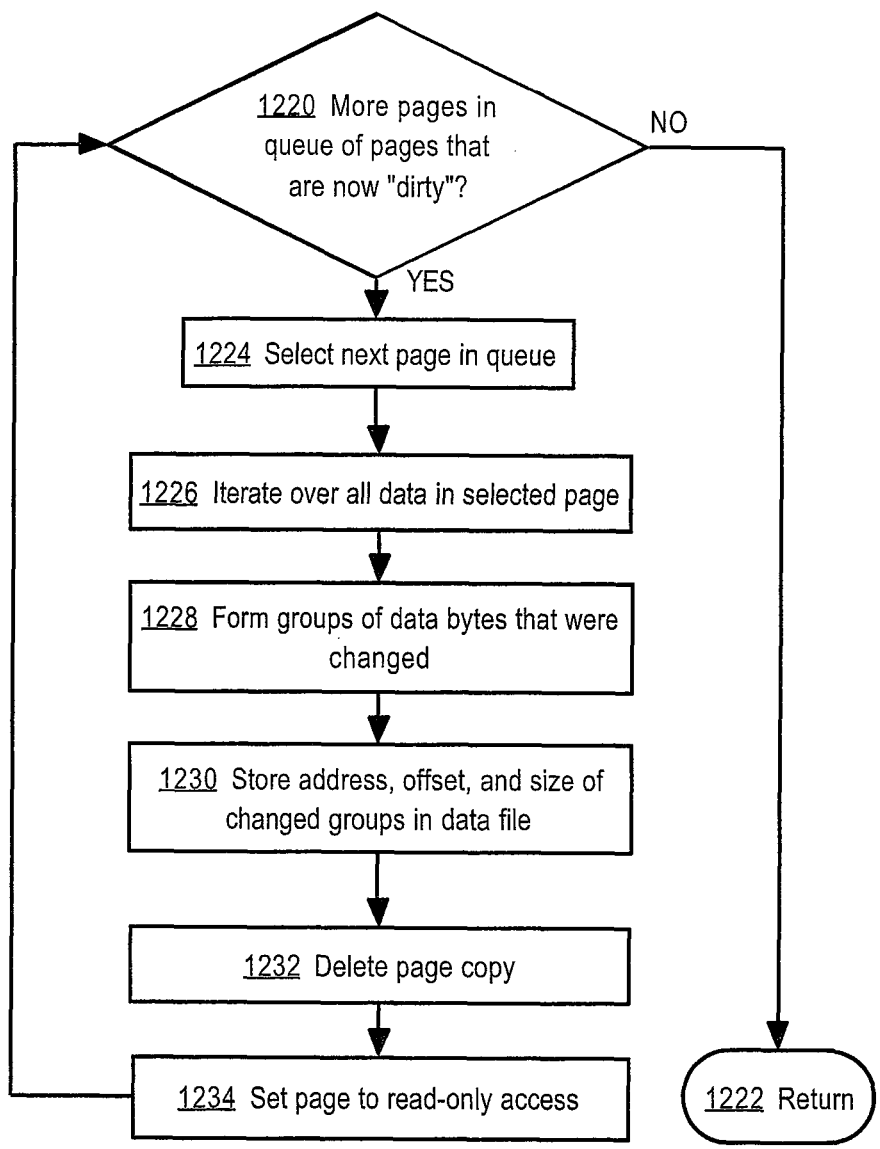
FIG. 12B and FIG. 12C are flow diagrams of an example state synchronization process as performed when recording execution of an application program.
Figure 12C:
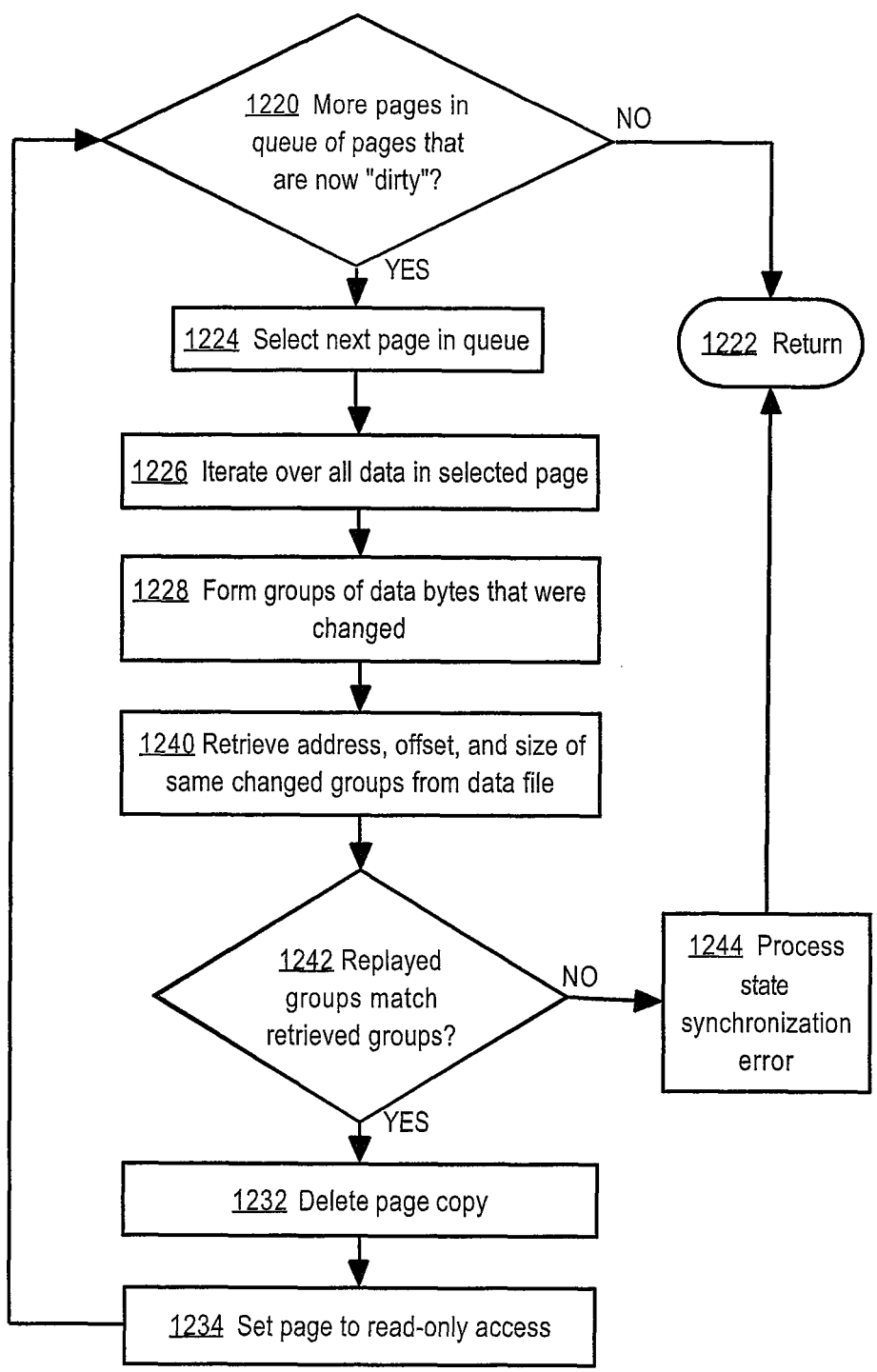

The general approach described above can be applied to ensure that memory state upon replaying the execution of an application program is synchronized to the memory state that existed when execution of the application program was recorded. FIG. 12A is a flow diagram of an example exception handler process for use in state synchronization. FIG. 12B and FIG. 12C are flow diagrams of an example state synchronization process as performed when recording execution of an application program.

In an embodiment for performing state synchronization, the general approach of FIG. 11A is used, and at step 1112 the exception handler of FIG. 12A is invoked. Thus, in one embodiment, an application program such as game binary 140 executes on computer system 100 and recording system 130 monitors execution and records information about the execution in persistent store 136. When the application program attempts a memory allocation operation, recording system 130 uses the process of FIG. 11B to set the allocated memory to read-only access. When the application program attempts to write the allocated memory, processor 102 or OS 104 throws an exception, and the exception handler of FIG. 12A is invoked.

The exception handler of FIG. 12A may be implemented as part of replay core 508 (FIG. 1B).

Referring now to FIG. 12A, in step 1202, the exception handler process receives an exception type and address of memory subject to an attempted write operation. The exception type enables the exception handler to filter out other exceptions that are unrelated to attempted memory write operations. The address indicates what memory location the application program attempted to access.

In step 1204, a memory page that contains the address is located. In an embodiment, to facilitate efficient memory read and copy operations under typical processor instruction sets and computer system architectures, the process operates on memory pages rather than individual addresses. A typical page size is 4 kilobytes. However, alternate embodiments may use individual addresses or memory blocks or segments other than pages when an instruction set or architecture supports reading and writing memory other than pages.

In step 1206, a copy of the located memory page is stored in a queue of pages. Thus, before an attempted memory write operation is allowed to be performed, the state of a page that will be affected by the write operation is saved. Saving the page before the write operation facilitates later evaluation to determine whether the write operation resulted in a non-deterministic state change during program execution. The page may be saved in a queue, list, or any other form of organized data storage. The queue may be referenced as a queue of pages that are known to be altered or "dirty" following the save operation and the write operation. As an alternative to storing a copy of the page, step 1206 may store a representation of the page or an identifier for the page. Examples of a representation or identifier include a checksum, hash, message authentication code, or other unique identifier.

In step 1208, the affected memory page is reset to read-write access so that the requested write operation can be performed without causing another exception. In an embodiment, recording system 130 invokes a function of OS 104 to reset the page to read-write access. In step 1210, the memory write operation is executed, and in step 1212 control returns to the calling process.

In an embodiment, once a block of memory is allocated and pages are stored in the foregoing manner, multiple write operations are allowed on the allocated memory.

Once a set of saved pages is created, other processes may be used during recording and replaying an application program to synchronize the state of memory when the program is replayed to match the state of memory that existed upon recording. In an embodiment, state synchronization processing is performed before and after system callbacks or function calls that occur during recording execution of an application program. Such callbacks usually cause changes in memory state, and such state changes should be synchronized between recording and replaying application program execution. In other embodiments, state synchronization is performed at other times according to a configuration that a user establishes.

Referring now to FIG. 12B, in step 1220, a test determines whether additional pages are present in a queue of pages that are now "dirty." If so, then in step 1224, the next page is selected. Thus, step 1220 represents iterating through all pages that were previously stored in the process of FIG. 12A and performing the successive steps in each iteration for each stored page.

In step 1226, all data that is currently in memory in the same page is examined. Thus, step 1226 involves comparing all data in the saved copy of a page to all data in that same page as it currently exists in memory, typically after one or more write operations have altered the page. Step 1228 forms groups of data bytes that were changed as a result of the write operations. The groups of bytes formed at step 1228 may consist of a list of addresses, offsets, and sizes. In a system that uses 32-bit addressing, the groups of bytes may comprise 4-byte chunks.

In step 1230, the address, offset, and size of changed groups of bytes are stored in a data file or other persistent storage of a recording system, such as in persistent store 136. The address, offset, and size values may be stored in serialized form to facilitate transfer of the information across a network or to other computer systems or applications. In an embodiment, for compactness, the actual data bytes are not stored, but only reference information is stored, such as address, offset and size. As a result, recording system 130 acquires a record of exactly which parts of memory were altered during program execution at the time that the program execution was recorded. In an alternate embodiment, the actual modified bytes could be stored.

In step 1232, the saved page copy is deleted because it is no longer needed. In step 1234, the page of the running computer system is again set to read-only access. Resetting the page to read-only access enables the recording system to capture subsequent changes to the same page by repeating the processes of FIG. 11A, FIG. 12A, FIG. 12B.

The process of FIG. 12C is performed when the execution of an application is replayed, to determine whether the state of memory upon replay matches the state of memory that existed when the execution of the application was earlier recorded.

Steps 1220-1228 correspond to FIG. 12B and are performed in the same manner described above. However, after a change is detected and represented in the form of groups of bytes at step 1228, in step 1240 and step 1242 the process of FIG. 12B searches the storage of the recording system to determine whether matching groups of bytes are represented in the storage. Generally, steps 1240-1242 involve determining whether the address, offset, and size of a group of changed bytes that is recognized during replay matches stored values that were captured during earlier recording of the application program.

If a matching group is found, then the state of memory at the time of replay is synchronized to the state of memory at the time of previous recording. In response, in step 1232 the saved page copy is deleted since it is no longer needed for comparison purposes, and the page is reset to read-only access to permit evaluation of subsequent changes.

If no matching group is found in storage, then the state of memory at the time of replay is different than the state of memory at the time of previous recording. In response, in step 1244 a state synchronization error is processed.

In an embodiment, step 1244 involves invoking a debugger for debugging the application program and setting a debugger breakpoint at the location in program execution at which step 1220 was invoked. For this purpose, step 1220 or another step may involve saving an instruction location at which FIG. 12C is invoked. Typically the breakpoint is set at or near an invocation of a callback or API function call.

A user can then search the program instructions to identify callbacks or function calls that caused the state synchronization error. Normally the search will be limited to a relatively small range of program instructions. Thus, in the approach herein a user is placed within the debugger at a location of the application program far closer to a likely source of a synchronization problem than in prior approaches. The approach herein allows detection of application program bugs far closer in the execution flow to a place where a bug actually exists, for example, at an API call, rather than thousands or millions of instructions later.

The embodiments described above address state changes in static memory and application heap memory. Additionally or alternatively, state changes in stack memory may be detected. In an embodiment, when a system call is entered, the recording system moves down the arguments of a function to the next memory page. The entire stack space above the new page is protected in the manner described above. As a result, changes in stack state can be detected during system calls, which is when loss of state synchronization is likely to occur.

In a further alternative or enhancement to the foregoing approaches, stack space addresses are preserved. In an embodiment, precise state synchronization is achieved by maintaining stack addresses on all threads between recording and replaying. As a result, execution decisions that are based on the stack addresses will proceed during replay exactly as they did during recording.

In an embodiment, recording system 130 upon recording and replaying gives the same deterministic stack space for all threads that an application program 140 creates to execute within. In an embodiment, operating system 104 provides this feature as a core function. Alternatively, recording system 130 uses a deterministic memory allocating function to generate addresses at recording and replaying time.

In an embodiment, when a new thread is about to execute, recording system 130 allocates memory space and moves the stack pointer to the top address of the new memory. Moving the stack pointer to the top address is performed on platforms, such as Microsoft Windows PCs, in which stack addresses grow downward; in other platforms the stack pointer may be moved to the bottom address or a first address. Special thread local variables that correspond to the old stack address are adjusted. Examples include variables that point to the current frame exception handler and minimum and maximum thread pointers.

When a thread has completed execution, recording system 130 detects the completion but does not allow the thread to immediately exit normally. Recording system 130 restores the stack pointer and all special thread local variables to their original values. Recording system 130 then allows the thread exit to occur.

5.2 Advancing and Rewinding Using State Points

5.2.1 Overview

In an embodiment, a computer system can record and replay the execution of an application program or other element of a unit under test. Recording and replaying facilitates, for example, performing debugging of the application program. Recording includes identifying and storing information about all non-deterministic inputs used by the program under test during execution, and replaying includes providing identical non-deterministic inputs in order to restore the state of the program and memory accurately. As a result, a user can replay a program under test repeatedly, assured of the same execution path and output, facilitating debugging and other analysis. During replay of the execution, embodiments permit skipping ahead to different points in execution of the program under test, or rewinding to prior points in execution of the program under test.

Embodiments facilitate the skip-ahead (or "fast forward") and rewind functions by creating and recording state point data during the recording phase. State point data captures the state of memory values associated with a program under test at a specified point in time during program execution. In an embodiment, a user can jump to any state point, at any time. Similarly, any 'State Point' can be rewound to by restoring the original memory state.

Moving to a different state point is accomplished by skipping code execution and restoring the recorded results of that execution to memory. In this way, embodiments provide techniques for creating and storing snapshots of data relating to the state of a system under test for use in restoring the system to the same state at a future point in time, to support a skip-ahead or fast-forward function when execution of the program is replayed, and to support a rewind function during replay of execution.

The capability of embodiments described herein enables a user to skip, if desired, problems occurring during replay. As a result, a user can selectively debug a program, so that the user is not required to fix each problem of a program in sequential order of execution or occurrence of the problems. Further, in the event that the recording phase improperly captured a source of program non-determinism so that replay does not occur correctly or becomes non-synchronized with other program data, the user can skip past that point in execution. For example, in an embodiment, the testing system during the replay phase will detect non-synchronization and report an error to the user; in response, in an embodiment the user can elect to skip the program code that caused an error in synchronization.

In an embodiment, an initialization approach captures an initial state of memory of a unit under test, and the state points comprise data representing changes to the state of memory as program execution occurs. The initial state may comprise a snapshot of the stack only if the program is at its first instruction, or an image of all of heap memory and static memory if the program is at a later state. In an embodiment, a rolling window of state point data is created. A first state point for the rolling window can be recorded at any point during execution, and previous data occurring earlier than that point can be discarded as execution continues. Further, problems occurring during replay can be skipped.

Figure 13:
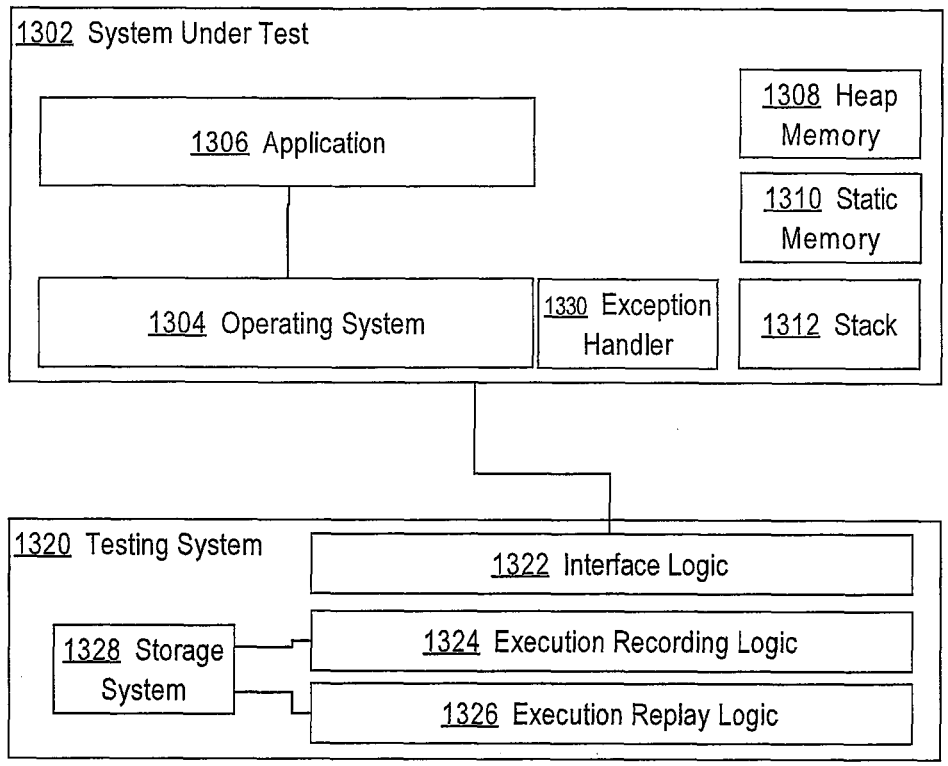
FIG. 13 illustrates a debugging system for a unit under test.

FIG. 13 illustrates a debugging system for a unit under test. A system under test 1302 comprises an operating system 1304 that supervises execution of an application 1306 and manages hardware resources including heap memory 1308, static memory 1310, and stack 1312. Heap memory 1308 comprises dynamic memory that application 1306 or operating system 1304 allocates and de-allocates essentially continuously during execution of the application. Static memory 1310 is available at all times during execution and does not require allocation; typically static memory stores global pointers and other long-lived data structures or values. The stack 1312 is high-speed memory that threads and other time-critical system resources or program elements access continuously and write with high frequency.

In an embodiment, heap memory 1308 and static memory 1310 are organized in units of data termed pages. For example, in certain embodiments a page of memory in heap memory 1308 or static memory 1310 comprises 4096 bytes. However, other embodiments may use other forms of memory organization and different operating systems may use different units. Therefore, in this description the term "page" refers broadly to any unit of memory that can be protected, copied or otherwise manipulated using an operating system, including bytes, words, blocks, segments, or other organizational units, depending on the architecture of the operating system, application, or unit under test or its processor(s).

In an embodiment, system under test 1302 is a computer game system such as a Nintendo system, Microsoft XBox system, Sony Playstation, or PC game system, and application 1306 is a computer game program. Other embodiments may be implemented using any other system under test and any other kind of application program, including but not limited to business applications, enterprise software applications, networking applications, scientific applications, medical applications, financial applications, etc.

The system under test 1302 further comprises one or more execution handlers 1330 for use in detecting changes to values in heap memory 1308 and static memory 1310. The use of exception handlers 1330 is further described in other parts of this disclosure.

The system under test 1302 is coupled to a testing system 1320. In various embodiments, testing system 1320 is integrated into the system under test 1302 or runs on the same hardware platform. In an embodiment, testing system 1320 comprises a storage system 1328, interface logic 1322, execution recording logic 1324, and execution replay logic 1326.

In an embodiment, storage system 1328 comprises a mass data storage system, such as a disk system. Any other form of non-volatile mass data storage may be used in other embodiments.

The interface logic 1322, execution recording logic 1324, and execution replay logic 1326 may be implemented separately or collectively as one or more computer programs, other software elements, or a combination of software and firmware. Interface logic 1322 may be coupled to the storage system 1328 and to the system under test 1302. Interface logic 1322 when executed is operable to interface to the heap memory and static memory.

In an embodiment, the execution recording logic 1324 records state points relating to application 1306 of the system under test 1302. In an embodiment, the execution recording logic 1324 when executed is operable to perform detecting one or more changes in a first state of the heap memory and the static memory; and storing, in the storage system, as a state point of the unit under test, the one or more changes in the first state of the heap memory and the static memory.

In an embodiment, execution replay logic 1326 when executed is operable to perform receiving a request to change the memory under test to a particular state point; and in response to the request, loading the particular state point from the storage system and applying the particular state point to the heap memory and the static memory to result in changing the heap memory and the static memory to a second state that is equivalent to the first state as represented in the state point.

In various embodiments, the interface logic 1322, execution recording logic 1324, and execution replay logic 1326 are configured to perform other logical functions as further described in this disclosure.

Figure 14:
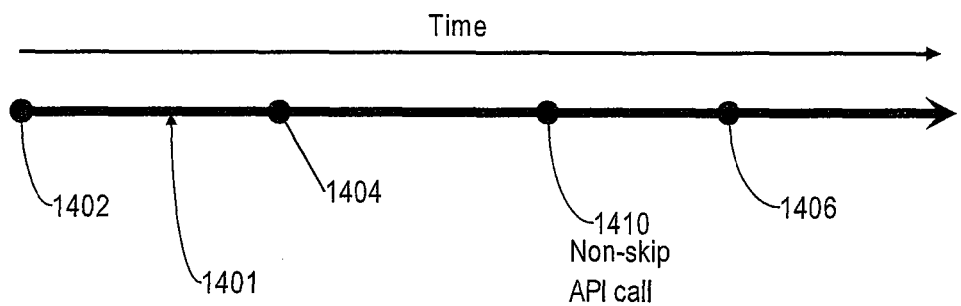
FIG. 14 is a time diagram of an execution of a unit under test.

FIG. 14 is a time diagram of an execution of a unit under test. In FIG. 14, arrow 1401 represents a period of execution of application 1306 or other elements of the system under test 1302 of FIG. 13. In FIG. 14, time advances from left to right in the drawing, and execution of application 1306 includes state points 1402, 1404, 1406 at successive points in time of execution.

In an embodiment, testing system 1320 stores, in storage system 1328, data about the state of memory, stack, system resources, threads and their contexts, and other data associated with each of the state points 1402, 1404, 1406 as the application 1306 executes. Thereafter, the testing system 1320 can replay the identical execution path of application 1306, and can change the point of execution to any of the state points 1402, 1404, 1406 in any order. Thus, testing system 1320 can implement fast-forward and rewind functions in the course of replaying the execution of application 1306. These functions enable a user to perform debugging or other analysis of application 1306 or other aspects of the system under test 1302.

Arrow 1401 and the execution path of application 1306 also may include one or more calls to application programming interface (API) functions of the operating system 1304 that the testing system 1320 cannot skip when execution of the application is replayed. Such API calls are termed non-skip API calls and are represented by non-skip API call 1410. The replaying of non-skip API calls is further described in other sections of this disclosure.

Figure 15:
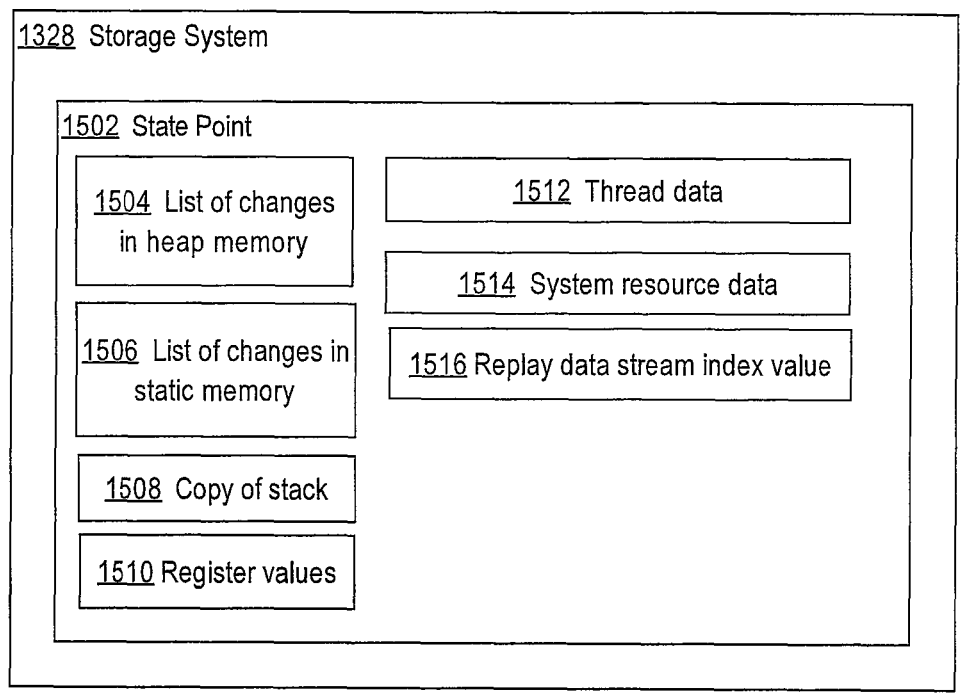
FIG. 15 is a block diagram of data associated with a state point.

FIG. 15 is a block diagram of data associated with a state point. The storage system 1328 is configured to store a plurality of state points 1502. For example, in a practical embodiment at least thousands of state points 1502 can be stored in the storage system 1328.

Heap memory 1308 and static memory 1310 may be large and may comprise gigabytes of data capacity. In an embodiment, each state point 1502 comprises an efficient and compact set of data about the state of application 1306 at a particular point in time. In an embodiment, each state point comprises a list of changes in heap memory 1504 (also termed list 1504), a list of changes in static memory 1506 (also termed list 1506), a copy 1508 of the stack 1312, register values 1510, thread data 1512, system resource data 1514, and a replay data stream index value 1516.

In this embodiment, list 1504 comprises a list of addresses and data values that reflect changes that the application 1306 made to heap memory during execution. List 1506 comprises a list of changes in static memory 1506 that the application 1306 made. Stack copy 1508 stores all values that were on the stack 1312 at the particular point in time. Register values 1510 comprises all values that were stored in registers of a CPU of the system under test 1302 at the particular point in time. Thread data 1512 comprises information about all program threads that were active in the system under test 1302 at the particular point in time and the contexts of such threads. Thread contexts comprise values of registers associated with threads, program counters, etc. System resource data 1514 comprises values such as operating system file pointers, window pointers, and window handles that the operating system 1304 has created during execution of the application 1306.

The replay data stream index value 1516 is a datum that uniquely represents a position of the state point in the execution path of the application 1306. For example, index value 1516 may comprise a unique integer. In an embodiment, index values increase sequentially as execution of the application 1306 proceeds.

Figure 16:
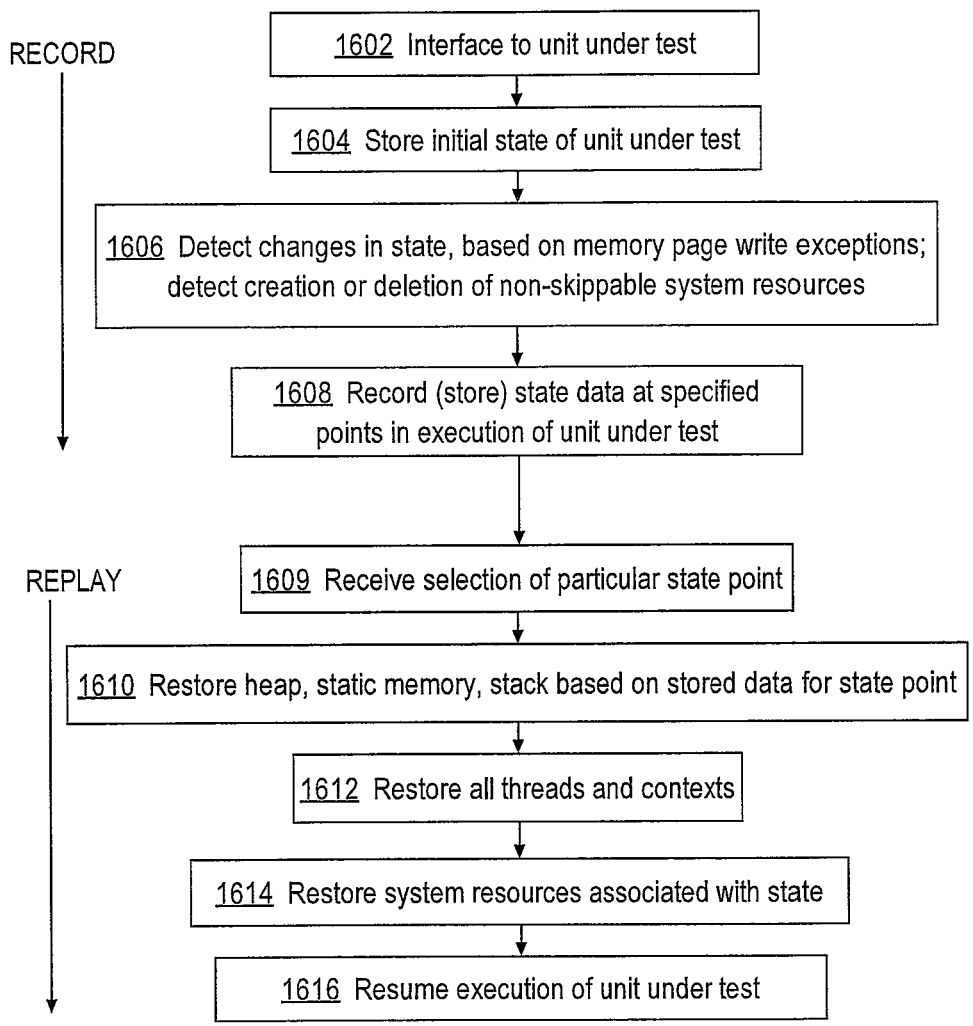
FIG. 16 illustrates a process of recording and replaying state points for an execution of a unit under test.

FIG. 16 illustrates a process of recording and replaying state points for an execution of a unit under test.

Steps 1602 to 1608 represent a record phase in which the testing system records or stores data for one or more state points during execution of the application 1306. In an embodiment, a user may initiate recording at any desired point in time. For example, the user can allow the program under test to execute for a first period of time, and then signal the testing system to begin recording state points, and then signal the system to stop recording state points but continue with program execution. The foregoing operations may be performed in any other order according to a preference of the user.

In step 1602, the process interfaces to the unit under test. Step 1602 represents establishing any form of data communication or connection between the testing system and the unit under test, so that the testing system can receive data values from memory of the unit under test.

In step 1604, the initial state of the system under test is stored, for example, using storage system 1328. Step 1604 may comprise storing a copy of the entire heap memory and entire stack memory in storage system 1328; if such an initial state is stored only occasionally then it will not adversely affect performance or storage requirements. Alternatively, if the program under test is starting at its first instruction, then step 1604 may comprise storing a first state point having zero values or specified values. Thereafter, the testing system can store state points that include only lists of changes from the initial state. The initialization step enables the testing system 1320 to accurately reproduce execution of the application 1306 at a later time, by starting at the known state and applying successive changes represented in state points until a desired point in execution is reached.

Initialization at step 1604 does not necessarily require starting program execution at a first instruction of the program under test. For example, referring again to FIG. 14, if the testing system has recorded state points 1402, 1404, 1406, and the user is no longer interested in performing debugging of program operation between those state points, then the user can request the testing system to set state point 1406 as the initial state and record state point data thereafter. In this approach, the testing system can delete data associated with state points 1402, 1404 and reclaim storage associated with those state points. Therefore, the storage system is used efficiently.

In step 1606, the testing system detects one or more changes in a state of the system under test based on memory write exceptions. As part of step 1606, the testing system determines when the system under test is writing data to heap memory or static memory. Particular processes for detecting changes using write exceptions are further described in other sections of this disclosure.

In step 1608, the testing system stores information about the changes in memory as part of a state point. The testing system may store state points at any specified point in time, and the storage of state points may be triggered in several different ways. For example, creating a state point may occur in response to a command-line command received from a user. Alternatively, the testing system may enable a user to schedule creating state points at periodic intervals, e.g., every minute or at any other useful time interval. Storing changes at step 1608 may involve analyzing changes to all pages for which changes were detected in step 1606. Step 1608 also may involve storing a copy of stack memory, thread data, thread contexts, system resources, and other values that represent program state at a particular point in time.

Steps 1609 to 1616 represent a replay phase in which a path of execution of the application 1306 is replayed to aid analysis of the application or other aspects of the system under test 1302. The replay phase may occur at any time after one or more state points have been recorded.

In step 1609, a selection of a particular state point is received. For example, a user of the testing system may signal the testing system to replay the execution of application 1306 starting at a particular state point, using any form of user input to the testing system. The user input may represent a request to fast forward or rewind.

In an embodiment, testing system 1320 generates a graphical user interface that is displayed on a display that is coupled to the testing system 1320. The user instructs the testing system 1320 to start replaying execution of application 1306 by selecting a state point from a list, graphical display, widget, or other user interface element. In other embodiments, input may be received programmatically from another program or system.

In various embodiments, the user may instruct the testing system 1320 to replay execution of the application 1306 at a state point that is later in time than a current point of execution, or earlier in time. Thus, upon receiving appropriate user input the testing system 1320 can play, fast-forward, or rewind execution of the application 1306 to facilitate debugging or other analysis.

In step 1610, the heap memory, static memory, and stack of the system under test are restored to values associated with the particular state point. For example, testing system 1320 retrieves a particular state point 1502 from the storage system 1328 and copies all data values of the state point to corresponding memory structures, registers, or other addresses of the system under test 1302.

In step 1612, the testing system 1320 restores all threads and context data of the system under test 1302. For example, the testing system 1320 copies thread data and context data of the state point to corresponding locations in the system under test 1302.

In step 1614, the testing system 1320 restores all system resources of the system under test 1302. For example, the testing system 1320 copies system resource data associated with the particular state point to corresponding locations in the system under test 1302.

In step 1616, execution of the system under test resumes. For example, testing system 1320 instructs the system under test 1302 to resume execution by providing the CPU of the system under test with an appropriate instruction.

5.2.3 Recording State Points

Figure 17:
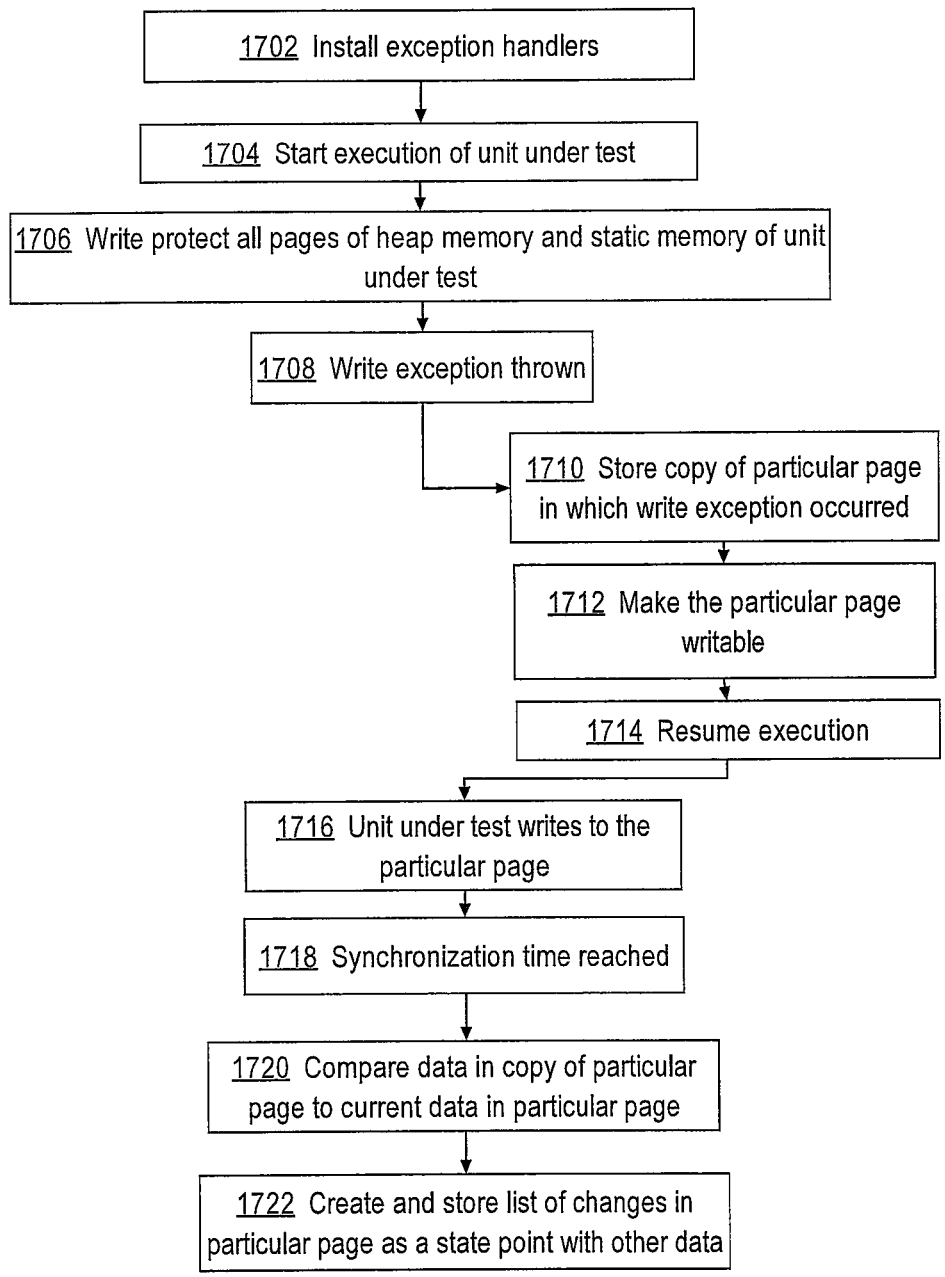
FIG. 17 illustrates a process of recording data for a state point using a write exception approach.

FIG. 17 illustrates a process of recording data for a state point using a write exception approach. FIG. 17 may be used to implement steps 1606, 1608 of FIG. 16. FIG. 17 may be implemented in computer program code as a discrete "Create State Point" function or call.

In step 1702, one or more exception handlers are installed in the system under test. An exception handler is a computer program segment that an operating system executes in response to detecting a particular kind of exception during execution of an application program, system program, or operating system operation. In an embodiment, step 1702 comprises the testing system 1320 installing an exception handler 1330 (FIG. 13) for memory write operations in the system under test 1302. The exception handler 1330 is called when the application 1306 attempts to write data to a write-protected portion of the heap memory 1308 or static memory 1310. Functional steps of the exception handler 1330 are shown in steps 1710, 1712, 1714 and are discussed in other sections of this disclosure.

In step 1704, execution of the unit under test is started. For example, the testing system 1320 instructs the system under test 1302 to start execution after initialization as previously described.

In step 1706, all pages of the heap memory 1308 and all pages of the static memory 1310 are write protected. For example, the testing system 1320 instructs the operating system 1304 to implement write protection for all pages of the heap memory 1308 and the static memory 1310. In this description, write protection may comprise any operation of the unit under test such that writing to a protected page causes an exception or interrupt to occur.

In step 1708, a write exception is thrown. Step 1708 occurs when the application program 1306 attempts to write a page of the heap memory 1308 or static memory 1310 that was write-protected in step 1706. The operating system 1304 throws the write exception, triggering execution of the installed exception handler 1330. In effect, step 1708 occurs in response to any attempt by the application 1306 to change memory of the system under test 1302.

Execution of the exception handler 1330 involves steps 1710, 1712, 1714. In step 1710, the exception handler stores a copy of the particular page for which the exception was thrown—that is, the page in memory that the application 1306 attempted to change. For example, exception handler 1330 stores a copy of a page in heap memory 1308 in storage system 1328.

In step 1712, the particular page is made writable. For example, exception handler 1330 requests the operating system 1304 to remove write protection from the particular page that the application 1306 attempted to write. As a result, the application 1306 will be able to successfully write the page in the future.

In step 1714, execution of the system under test resumes. For example, exception handler 1330 returns control to the operating system.

In step 1716, the system under test writes to the particular page. For example, application 1306 writes changed data to the page that it attempted to change at step 1708. Thus, steps 1708-516 involve detecting an attempt to write a page in memory, saving an unchanged copy of the page in storage for future reference and to capture the state of the system under test at the time of the change, and then allowing the system under test to successfully write the page. Steps 1708-516 can occur transparent to the system under test and without interrupting its execution for more than a few milliseconds.

In step 1718, a synchronization point is reached during execution of the system under test. A synchronization point is a point in program execution that the system uses to ensure that a state of program execution upon replay is synchronized with the corresponding state at the time of recording program execution.

In step 1720, the process compares the data in the copy of each particular memory page, which was stored at step 1710, to the current data of the same page location. In an embodiment, all memory pages for which changes were detected are subjected to a comparison operation at step 1720. "Memcompare" operations of the operating system may be used.

In step 1722, the process creates and stores a list of changes that occurred in the particular page between the time at which the copy was stored (at step 1710) and the current time. The list of changes is based on results of the comparison operations of step 1720. The list of changes covers all changes to all memory pages for which changes were detected. The list of changes may be stored as part of a state point using the organizational arrangement of FIG. 15. The terms "deltas" or "differences" may be used to refer to the changes. Using a list of changes captures memory state efficiently and without storing a copy of the entire memory, which could comprise gigabytes. Consequently, many state points can be stored to permit moving among many points of program execution.

Step 1722 also may involve storing, as part of the same state point, a copy of stack memory, thread data, thread contexts, system resources, and other values that represent program state at a particular point in time. Step 1722 also may involve storing, as part of a state point, one or more sync index values into the replay data stream. Storing a sync index value with a state point enables the testing system to replay program execution correctly by capturing a value representing a discrete point in program execution.

State points may be stored in a state point stream in non-volatile storage.

5.2.4 Moving Among State Points—Fast Forward and Rewind

Figure 18:
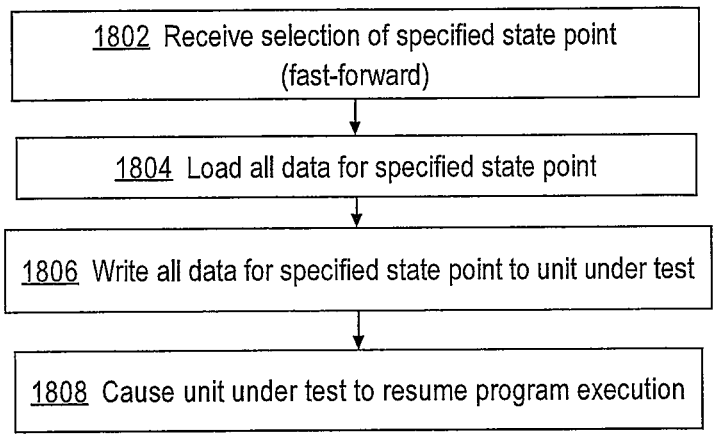
FIG. 18 illustrates a process of moving execution of a unit under test to a later state point.

FIG. 18 illustrates a process of moving execution of a unit under test to a later state point. FIG. 18 is an example of a process that may be performed during a reply phase, for fast forwarding the execution of a system under test to a later state point. For example, FIG. 18 assumes that the application 1306 has executed, one or more state points were recorded and stored during execution of the application, that execution of the application has been replayed, and that the testing system 1320 has received user input or other signaling requesting to move the execution point to a next state point or forward in time. FIG. 18 may be implemented programmatically as a "Next State Point" function.

In step 1802, a selection of a particular state point is received. For example, step 1802 involves receiving user input requesting to move the current point of execution of application 1306 ahead in time with respect to a prior recording of the execution. Thus, step 1802 may involve receiving user input indicating a request to skip ahead by one state point or to move to the next point. Alternatively, step 1802 may comprise receiving a programmatic call to a Next State Point function, which implies that the caller wishes to advance to the next state point available.

In step 1804, all data for the specified state point is loaded. For example, step 1804 involves reading all the data associated with the specified state point from the storage system 1328 and temporarily storing the data in system memory of the testing system 1320.

In step 1806, all data for the specified state point is written to the system under test. For example, step 1806 involves writing all the state point data from system memory to corresponding locations in the system under test. As a result, the state of the system under test changes to correspond to the stored state point. Certain system resources, for example internal system pointers such as file pointers, window pointers, handles, When all data shown in FIG. 15 is stored in a state point and restored at step 1806, the state of an application program the system under test will have the same state as it had when the state point was originally recorded, except for non-deterministic behavior changes that may arise from operation of the operating system of the system under test. That is, only operating system resources "owned" by the application are assured to be in the same state, but not the operating system itself.

In step 1808, the process causes the system under test to resume execution. For example, the process requests the operating system 1304 to resume executing the application 1306.

Figure 19:
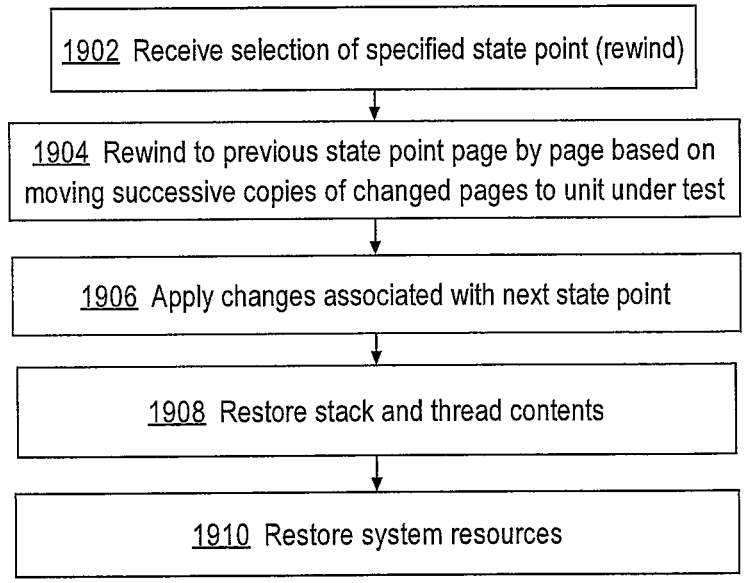
FIG. 19 illustrates a process of moving execution of a unit under test to an earlier state point.

FIG. 19 illustrates a process of moving execution of a unit under test to an earlier state point. FIG. 19 is an example of a process of rewinding the execution of a system under test to a later state point. For example, FIG. 19 assumes that the application 1306 has executed, one or more state points were recorded and stored during execution of the application, that execution of the application has been replayed, and that the testing system 1320 has received user input or other signaling requesting to move the execution point to a previous state point or earlier in time.

In step 1902, a selection of a specified state point is received. The specified state point is earlier in time, in relation to a path of execution of a previous recording of execution of the application 1306, than the current time.

Before step 1902, and during all times during replay of a program, the steps described above for FIG. 17 are performed, for the original state point and the specified state point, as a check to verify that the replay phase remains in synchronization with the recorded program execution. Thus, for example, during replay, write protection is enabled on all pages of heap memory and static memory, write exceptions are thrown when the application under test performs a write to a protected memory page, copies of modified pages are maintained, changes are computed, etc., as in FIG. 17. This approach enables the system to perform a rewind function during replay by using information created and stored during recording of program execution while maintaining state synchronization.

In step 1904, the process rewinds the execution point to a previous state point based on restoring the system to a first available state point and then applying changes of successive state points until the specified state point is received. In an embodiment, step 1904 comprises first changing the state of the system under test to the known state of initialization that existed when the application 1306 initiated execution. In other words, the system is restored to its initial state, not to an immediately earlier state point. Alternatively, the system is restored to its state at a first state point that was recorded after program execution began.

For example, referring to FIG. 14, if program replay currently is ahead of state point 1406, and the user requests rewinding to state point 1404, then the process of FIG. 19 first restores the system under test to the first state point 1402, then applies changes associated with state point 1404 to reach state point 1404, resulting in effectively rewinding from state point 1406 to state point 1404.

Rewinding includes retrieving original, unmodified pages that the system stored in accordance with FIG. 17 at the time that changes occurred to memory, usually at the first state point that was recorded. Thus, the system is capable of retrieving the original versions of all pages as they existed at the first state point. Then, the system under test is restored to successive state points one by one, by retrieving each recorded state point in order from the storage system, and applying changes indicated in the lists 1504, 1506. Other state point data such as stack copy 1508, register values 1510, thread data 1512, and system resource data 1514 is restored to corresponding locations in the system under test. The sub-steps of step 1904 are repeated until the state of execution reaches one state point prior to the requested or specified state point.

In step 1906, data for the requested or specified state point is loaded, and all changes represented in the lists 1504, 1506 are applied to the system under test. In step 1908, the contents of the stack and threads are restored to the system under test based on the data stored for the state point. In step 1910, system resources are restored based on the data stored for the state point. At the completion of step 1910, the system under test 1302 has reached the requested state point. From the standpoint of the user, execution of the application 1306 has been rewound to the prior state point.

5.2.5 Handling Synchronization Errors

In an embodiment, execution replay logic 1326 includes logic for detecting replay synchronization errors. In one embodiment, the execution replay logic 1326 is configured to receive, at a particular point in execution of the unit under test, data about a write exception to a particular page; determining whether the storage system includes data about the write exception; determining that a replay synchronization error has occurred when the storage system does not include data about the write exception, and response thereto: setting the unit under test to a second state point that is earlier than the particular point in execution, by retrieving stored pages of the heap memory and the static memory associated with the second state point and copying the retrieved stored pages of the heap memory and the static memory associated with the second state point to the heap memory and the static memory of the unit under test; applying, to the heap memory and the static memory of the unit under test, all changes associated with the next state point stored in the storage system after the second state point; and repeating the applying step until reaching another state point that is closest in time to the particular point in execution.

The use of page exceptions as described above for FIG. 17 facilitates detecting synchronization errors. In particular, list of changes in heap memory 1504 can be used to identify all pages in heap memory that were changed, and list of changes in static memory 1506 can be used to identify all pages in static memory that were changed. When a write exception occurs during the replay phase, the execution replay logic 1326 examines the stored lists to determine whether the same page was written during the recording phase. If not, then a synchronization error has occurred.

To recover from the error, the stored copy of the original page is restored. The Next State Point operation, described above, can be called to recover. System resources, threads and thread contexts, stack contents, and other data relating to a state point are also recovered.

3.4 Restoring System Resources

In an embodiment, execution replay logic comprises logic configured to restore system resources including threads and selected operating system resources that programs address using API calls. In a typical operating system, hundreds of types of system resources are available, and a typical application program might use several dozen resources. An example system resource is a call to a function that creates a window in a particular location of the display screen. To restore all such resources to the correct state during the replay phase, custom code would be needed. As an alternative to such a brute-force approach, the present disclosure focuses on addressing selected API calls, such as those relating to windows and threads; these selected functions are termed non-skip APIs as represented by non-skip API call 1410 of FIG. 14.

To ensure that non-skip APIs are not skipped upon replay, in an embodiment, the execution recording logic 1324 automatically creates marker state points just before each non-skip API call. Thus, regardless of any other trigger mechanism that the user has established for creating state points, marker state points are always created at non-skip API calls. This approach assures that state transitions relating to the calls are captured and that the calls will be executed upon replay. In one embodiment, the execution recording logic 1324 is configured to perform the detecting and storing for a marker state point automatically just before the unit under test executes any of a plurality of specified operations of an operating system of the unit under test. In one embodiment, the specified operations comprise windowing operations and thread operations.

On replay, a user is not permitted to fast-forward or jump among state points if a non-skip API call would be skipped in the transition. Further, whenever a user or program attempts to skip from one state point to another state point and a non-skip API is between the two state points, the execution replay logic requires program execution to move to the marker state point just before the non-skip API, call the non-skip API, wait for the API call to return, and then skip ahead to the next state point. This approach assures that each non-skip API call is actually called on replay and assures that resulting state values remain in synch. Accordingly, in an embodiment, the execution replay logic 1326 is configured to perform fast-forward replay of execution of the unit under test by automatically changing the unit under test to a state represented by a particular marker point; causing the unit under test to execute one of the specified operations; and changing the unit under test to a state represented by a next state point in the storage system.

Figure 20:
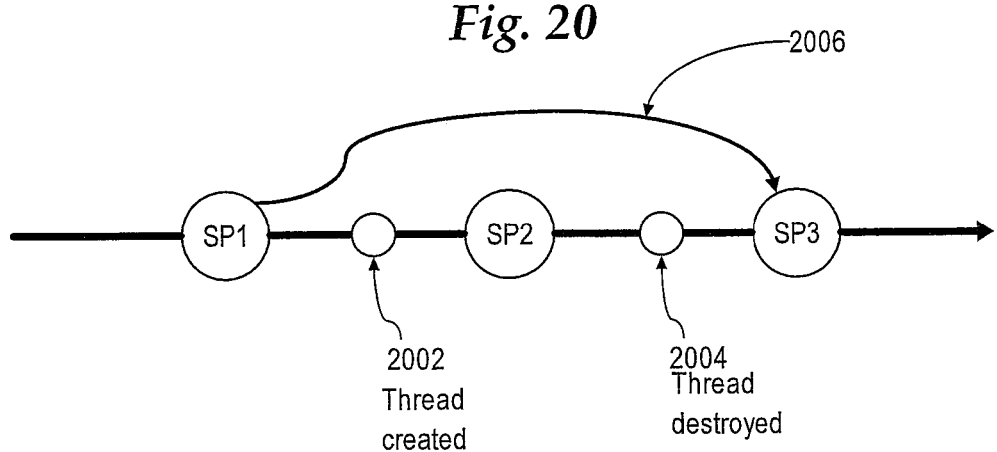
FIG. 20 is a time diagram showing points of creating and destroying thread data during an execution of a unit under test.

API calls relating to threads and thread context data are examples of non-skip APIs. However, in performing movement among state points, not all thread data is required to be restored. As an example, FIG. 20 is a time diagram showing points of creating and destroying thread data during an execution of a unit under test. Assume that state points SP1, SP2, SP3 have been recorded and stored during execution of application 1306. Assume further that a thread was created at point 2002, after state point SP1 and before state point SP2. Assume that the same thread was destroyed at point 2004, after state point SP2 and before state point SP3. Finally assume that the user wishes to change the state of execution from SP1 to SP3. In this scenario, there is no need to restore data for the thread, because the thread was both created and destroyed by the time of SP3, and therefore after SP3 the thread can have no effect on program execution.

The preceding sections describe detecting when an application program performs a memory read operation or memory write operation using memory protection and exception handling techniques. In alternative embodiments, detecting memory operations may be performed in other ways. For example, in one embodiment recording system 1330 detects kernel calls that relate to memory read operations or memory write operations, and determines whether state synchronization exists or race conditions are present using processing other than exception handling. Thus, the broad approach herein involves detecting memory read operations or memory write operations and performing responsive processing to detect state synchronization or race conditions, but the use of memory protection and exception handlers is not required.

In one approach, a software module that resides in kernel space, as opposed to user space, has the ability to monitor memory accesses made by one or more applications running in user space. This approach may be used with any operating system, such as Linux for which the kernel is open source and accessible. Alternatively, the approach may be used with virtual machines such as Java or .NET. By monitoring access to the kernel memory manager, all memory accesses made by one or more applications can be tracked and analyzed.

In another approach, a customized replacement memory management component is installed at the kernel level, and is responsible for all memory creation and destruction, and allows control of memory accesses. The custom memory management component may act as a layer between the standard kernel memory manager and user space that provides an opportunity to exercise control over memory access. This system would control all memory accesses made by one or more applications.

In another approach, a hardware module such as a customized memory management processor can send notifications when memory access occurs. The module sends data including the memory address accessed, the type of access, and which hardware thread is accessing the memory. The data may also include the contents of the access in the case of a write, or the scope of the access in the case of a read or execute. The module would provide all data necessary to detect race conditions as well as perform other recording and playback functions. The hardware module can be implemented using modified standard memory management processors.

6.0 Implementation Mechanisms—Hardware Overview

Figure 9:
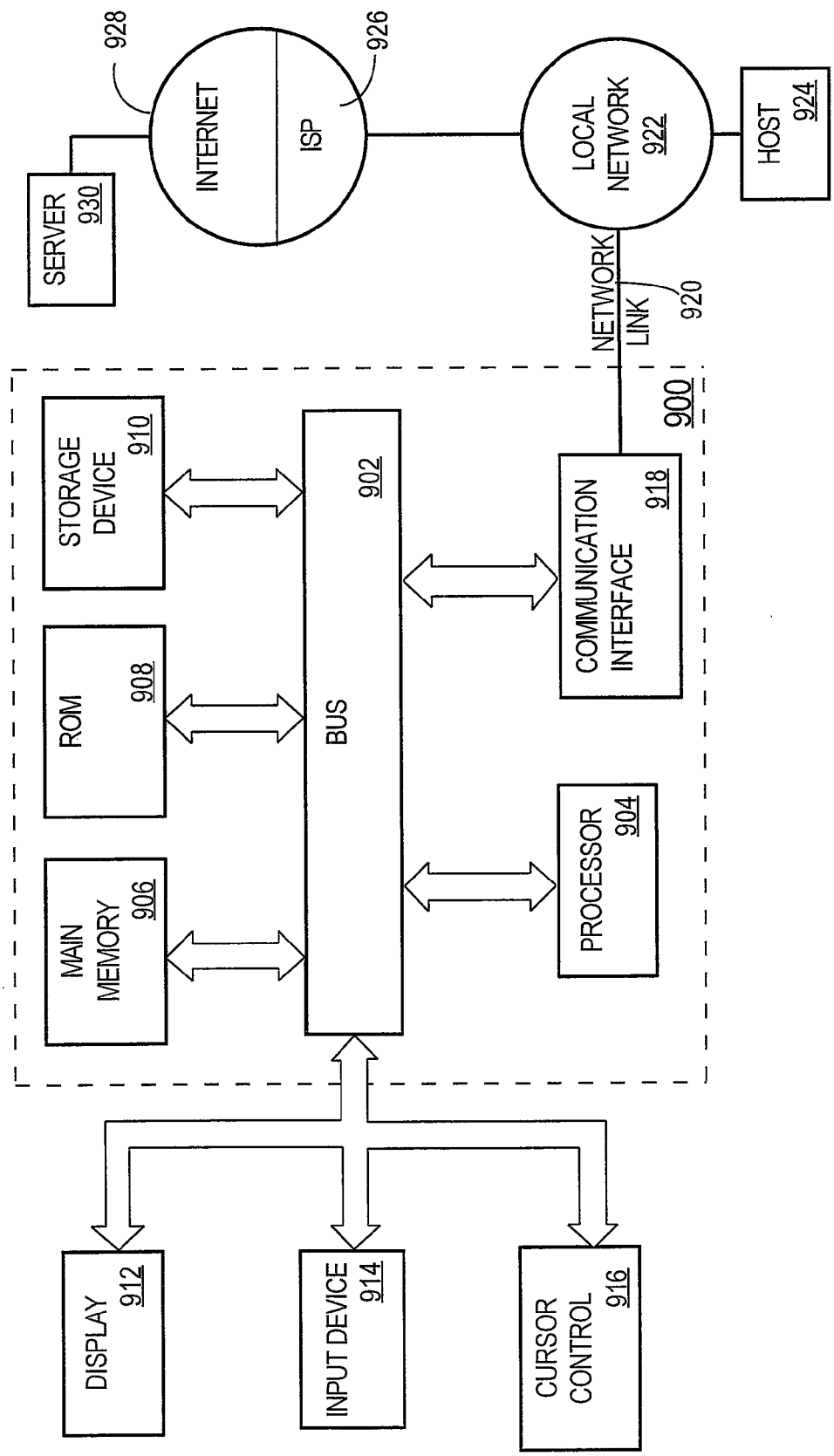
FIG. 9 is a block diagram that illustrates a computer system upon which an embodiment may be implemented.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory ("RAM") or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory ("ROM") 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube ("CRT"), for displaying information to a computer user. An input device 914, including alphanumeric and other keys, is coupled to bus 902 for communicating information and command selections to processor 904. Another type of user input device is cursor control 916, such as a mouse, trackball, stylus, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for recording and replaying computer programs. According to one embodiment of the invention, recording and replaying computer programs is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector can receive the data carried in the infrared signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network ("ISDN") card or a modem to provide a data communication connection to a corresponding type of telephone line. As another example, communication interface 918 may be a local area network ("LAN") card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider ("ISP") 926. ISP 926 in turn provides data communication services through the worldwide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for recording and replaying computer programs as described herein.

The received code may be executed by processor 904 as it is received, and/or stored in storage device 910, or other non-volatile storage for later execution. In this manner, computer system 900 may obtain application code in the form of a carrier wave.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
   interfacing to a storage system and to a unit under test comprising a heap memory, a static memory and a stack;
   detecting a change in a first state of the heap memory and the static memory, comprising detecting an attempt to write a page in the heap memory or the static memory; and
   storing, in the storage system, as a first state point of the unit under test, the change in the first state of the heap memory and the static memory, the storing comprising:
   saving an unchanged copy of the page in the storage system;
   allowing the unit under test to successfully write the page to the heap memory or the static memory;
   comparing the page the unit under test wrote with the unchanged copy of the page in storage to determine the change in the first state of the heap memory and the static memory; and
   storing the change in the first state of the heap memory and the static memory in the storage system based on the comparing.

2. The method of claim 1, further comprising:
   receiving a request to change the unit under test to the first state point;
   in response to the request, loading the first state point from the storage system and applying the first state point to the heap memory and the static memory to result in changing the heap memory and the static memory to a second state that is substantially equivalent to the first state.

3. The method of claim 1, further comprising:
   causing the unit under test to write-protect all pages of the heap memory and the static memory; and
   installing in the unit under test a first exception handler responsive to a first write exception of the heap memory and a second exception handler responsive to a second exception of the static memory, wherein the first and second exception handlers are configured to respond to a particular write exception of a particular page by storing a second page that is a copy of the particular page, making the particular page writable, and restoring execution of the unit under test, wherein the particular page is written to subsequent to restoring execution.

4. A method comprising:
   interfacing to a storage system and to a system under test comprising a heap memory, a static memory and a stack;
   detecting a change in a first state of the heap memory and the static memory during a record phase;
   storing, in the storage system, as a first state point of the system under test, the change in the first state of the heap memory and the static memory;
   receiving a request to change the system under test during a replay phase to the first state point, wherein the first state point is earlier in time than a current point of execution of the system under test in the replay phase;
   in response to the request, restoring the system under test to a second state point that is earlier in time than the first state point by retrieving stored pages of the heap memory and the static memory associated with the second state point and copying the retrieved stored pages of the heap memory and the static memory associated with the second state point to the heap memory and the static memory of the system under test;
   reading all data associated with the first state point from the storage system; and
   applying all changes associated with the first state point to the heap memory and the static memory of the system under test after the copying.

5. The method of claim 4, further comprising storing a copy of the stack as part of the first state point.

6. The method of claim 4, further comprising:
   storing thread data and thread context associated with the first state as part of the first state point;
   storing data about a resource associated with the first state as part of the first state point;
   restoring the thread data and the thread context that is associated with the first state; and
   restoring the resource that is associated with the first state.

7. A method comprising:
   interfacing to a storage system and to a unit under test comprising a heap memory, a static memory and a stack;
   detecting a change in a state of the heap memory and the static memory during a record phase;
   storing, in the storage system, as a state point of the unit under test, the change in the state of the heap memory and the static memory;
   receiving a request to change the unit under test during a replay phase to the state point, wherein the state point is later in time than a current point of execution of the unit under test in the replay phase;
   in response to the request:
   reading all data associated with the state point from the storage system; and
   applying all changes associated with the state point to the heap memory and the static memory of the unit under test.

8. A non-transitory computer-readable storage hardware device comprising instructions which, when executed by a processor, cause the processor to:
   interface to a storage system and to a system under test comprising a heap memory, a static memory and a stack;
   detect a change in a state of the heap memory and the static memory, comprising detecting an attempt to write a page in the heap memory or the static memory; and
   store, in the storage system, as a state point of the system under test, the change in the state of the heap memory and the static memory, the instructions which, when executed by the processor, cause the processor to store comprise instructions which, when executed by the processor, cause the processor to:
save an unchanged copy of the page in the storage system;
allow the system under test to successfully write the page to the heap memory or the static memory;
compare the page the system under test wrote with the unchanged copy of the page in storage to determine the change in the state of the heap memory and the static memory; and
store the change in the state of the heap memory and the static memory in the storage system based on the comparing.

9. A non-transitory computer-readable storage hardware device comprising instructions which, when executed by a processor, cause the processor to:
interface to a storage system and to a unit under test comprising a heap memory, a static memory and a stack;
detect a change in a state of the heap memory and the static memory during a record phase;
store, in the storage system, as a first state point of the unit under test, the change in the state of the heap memory and the static memory;
receive a request to change the unit under test during a replay phase to the first state point, wherein the first state point is earlier in time than a current point of execution of the unit under test in the replay phase;
in response to the request, restore the unit under test to a second state point that is earlier in time than the first state point, the instructions that cause the processor to restore comprise instructions that cause the processor to retrieve stored pages of the heap memory and the static memory associated with the second state point and copy the retrieved stored pages of the heap memory and the static memory associated with the second state point to the heap memory and the static memory of the unit under test;
read all data associated with the first state point from the storage system; and
apply all changes associated with the first state point to the heap memory and the static memory of the unit under test after the processor copies the retrieved stored pages.

10. A non-transitory computer-readable storage hardware device comprising instructions which, when executed by a processor, cause the processor to:
interface to a storage system and to a unit under test comprising a heap memory, a static memory and a stack;
detect a change in a state of the heap memory and the static memory during a record phase;
store, in the storage system, as a state point of the unit under test, the change in the state of the heap memory and the static memory;
receive a request to change the unit under test during a replay phase to the state point, wherein the state point is later in time than a current point of execution of the unit under test in the replay phase;
in response to the request:
read all data associated with the state point from the storage system; and
apply all changes associated with the state point to the heap memory and the static memory of the unit under test.

11. A system, comprising:
a processor configured to:
interface to a storage system and to a unit under test comprising a heap memory, a static memory and a stack;
detect a change in a state of the heap memory and the static memory, comprising detecting an attempt to write a page in the heap memory or the static memory; and
store, in the storage system, as a state point of the unit under test, the change in the state of the heap memory and the static memory, the processor being configured to store comprises the processor being configured to:
save an unchanged copy of the page in the storage system;
allow the unit under test to successfully write the page to the heap memory or the static memory;
compare the page the unit under test wrote with the unchanged copy of the page in storage to determine the change in the state of the heap memory and the static memory; and
store the change in the state of the heap memory and the static memory in the storage system based on the comparing.

12. A system, comprising:
a processor configured to:
interface to a storage system and to a unit under test comprising a heap memory, a static memory and a stack;
detect a change in a state of the heap memory and the static memory during a record phase;
store, in the storage system, as a first state point of the unit under test, the change in the state of the heap memory and the static memory;
receive a request to change the unit under test during a replay phase to the first state point, wherein the first state point is earlier in time than a current point of execution of the unit under test in the replay phase;
in response to the request, restore the unit under test to a second state point, the processor being configured to restore comprises the processor being configured to retrieve stored pages of the heap memory and the static memory associated with the second state point that is earlier in time than the first state point and copy the retrieved stored pages of the heap memory and the static memory associated with the second state point to the heap memory and the static memory of the unit under test;
read all data associated with the first state point from the storage system; and
apply all changes associated with the first state point to the heap memory and the static memory of the unit under test after the processor copies the retrieved stored pages.

13. A system, comprising:
a processor configured to:
interface to a storage system and to a unit under test comprising a heap memory, a static memory and a stack;
detect a change in a state of the heap memory and the static memory during a record phase;
store, in the storage system, as a state point of the unit under test, the change in the state of the heap memory and the static memory;
receive a request to change the unit under test during a replay phase to the state point, wherein the state point is later in time than a current point of execution of the unit under test in the replay phase;
in response to the request:
read all data associated with the state point from the storage system; and
apply all changes associated with the state point to the heap memory and the static memory of the unit under test.

* * * * *